(12) United States Patent
Oto et al.

(10) Patent No.: US 12,146,227 B2
(45) Date of Patent: Nov. 19, 2024

(54) HYDROGEN SYSTEM

(71) Applicant: Panasonic Intellectual Property Management Co., Ltd., Osaka (JP)

(72) Inventors: Takashi Oto, Osaka (JP); Hiromi Kita, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 941 days.

(21) Appl. No.: 16/953,195

(22) Filed: Nov. 19, 2020

(65) Prior Publication Data

US 2021/0071310 A1 Mar. 11, 2021

Related U.S. Application Data

(63) Continuation of application No. PCT/JP2020/006736, filed on Feb. 20, 2020.

(30) Foreign Application Priority Data

Apr. 9, 2019 (JP) .................................. 2019-074299
Jan. 27, 2020 (JP) .................................. 2020-010890

(51) Int. Cl.
*C25B 1/04* (2021.01)
*B01D 53/26* (2006.01)
(Continued)

(52) U.S. Cl.
CPC .................. *C25B 1/04* (2013.01); *C25B 9/19* (2021.01); *C25B 9/70* (2021.01); *C25B 9/73* (2021.01);
(Continued)

(58) Field of Classification Search
CPC ........ C25B 1/04; C25B 15/021; B01D 53/326
See application file for complete search history.

(56) References Cited

U.S. PATENT DOCUMENTS

| | | | |
|---|---|---|---|
| 5,306,577 | A | 4/1994 | Sprouse |
| 2003/0196893 | A1 | 10/2003 | McElroy et al. |

(Continued)

FOREIGN PATENT DOCUMENTS

JP  2015-166478  9/2015

OTHER PUBLICATIONS

The Extended European Search Report dated May 30, 2022 for the related European Patent Application No. 20787859.6.
(Continued)

*Primary Examiner* — Ciel P Contreras
(74) *Attorney, Agent, or Firm* — Rimon P.C.

(57) ABSTRACT

A hydrogen system includes: a water electrolysis apparatus including a water electrolysis cell; an electrochemical hydrogen pump that increases the pressure of hydrogen-containing gas produced by the water electrolysis apparatus; a gas flow path that supplies the hydrogen-containing gas produced by the water electrolysis apparatus to the electrochemical hydrogen pump; and a first flow path through which a first heat medium that is a liquid and has collected waste heat of the water electrolysis cell flows. The electrochemical hydrogen pump is capable of performing heat exchange with the first heat medium having collected waste heat of the water electrolysis cell.

28 Claims, 8 Drawing Sheets

(51) Int. Cl.
*C25B 9/19* (2021.01)
*C25B 9/70* (2021.01)
*C25B 9/73* (2021.01)
*C25B 15/02* (2021.01)
*C25B 15/021* (2021.01)
*C25B 15/08* (2006.01)

(52) U.S. Cl.
CPC .......... *C25B 15/02* (2013.01); *C25B 15/021* (2021.01); *C25B 15/08* (2013.01); *B01D 53/26* (2013.01)

(56) References Cited

U.S. PATENT DOCUMENTS

| | | | |
|---|---|---|---|
| 2010/0266923 A1* | 10/2010 | McElroy | H01M 8/04798 429/444 |
| 2014/0102911 A1* | 4/2014 | Kurashina | C25B 9/05 204/278 |
| 2015/0211132 A1* | 7/2015 | MacKinnon | H01M 8/0656 204/252 |
| 2016/0122882 A1* | 5/2016 | Oomura | C25B 9/73 205/637 |
| 2019/0214885 A1* | 7/2019 | Perry | H02K 9/10 |
| 2020/0316522 A1* | 10/2020 | Rheaume | C25B 9/23 |

OTHER PUBLICATIONS

International Search Report of PCT application No. PCT/JP2020/006736 dated May 19, 2020.

Hiroyuki Ota et al., "Toshiba Review", Toshiba Corporation, vol. 71, No. 5 (2016), Sep. 2016, pp. 30-36 (Partial Translation).

* cited by examiner

HYDROGEN SYSTEM

BACKGROUND

1. Technical Field

The present disclosure relates to a hydrogen system.

2. Description of the Related Art

In recent years, depletion of fossil fuels such as coal and petroleum and also global warming due to carbon dioxide have been regarded as problems. To address these problems, efforts are being made actively toward an energy society less dependent on fossil fuels. As one of such efforts, there is proposed a hydrogen society in which the following hydrogen system is introduced. Specifically, a hydrogen system produces hydrogen by electrolyzing water. Then, the produced hydrogen (gas) is compressed and stored in a hydrogen tank, and the stored hydrogen is converted into electricity by a fuel cell system to meet power demand. This hydrogen system mainly includes a water electrolysis apparatus that electrolyzes water, an electrochemical hydrogen pump that compresses produced hydrogen, and a device system such as a fuel cell system that converts hydrogen into electricity.

As an example of the above hydrogen system, there is proposed a power generation system that utilizes hydrogen produced by using electric power obtained from renewable energy for fuel for fuel cells (for example, see Toshiba Review Vol. 71, No. 5, (2016), pp. 30-36, which is hereinafter referred to as Non Patent Literature 1). This power generation system enables self-sufficiency of electric power consumed in a house, a building, or the like without depending on electric power from existing systems.

Meanwhile, from the viewpoint of improving the proton conductivity and the reactivity of the electrode catalyst in the electrolyte provided between the anode and the cathode in a water electrolysis stack, the water electrolysis apparatus needs to be at a certain high temperature when it starts operation. In this respect, Japanese Unexamined Patent Application Publication No. 2015-166478 (hereinafter referred to as Patent Literature 1) proposes a water electrolysis system in which heat exchange is performed between the water used for electrolysis in the water electrolysis stack and the heat medium for cooling the fuel cells. This water electrolysis system causes the heat medium and the water to perform heat exchange to increase the temperature of the water when stopping the fuel cells and staring operation of the water electrolysis system, and thereby the water electrolysis system can heat the water electrolysis stack.

SUMMARY

Unfortunately, in the conventional techniques (Patent Literature 1 and Non Patent Literature 1), heat utilization between the water electrolysis apparatus and the electrochemical hydrogen pump in a hydrogen system was not fully studied.

One non-limiting and exemplary embodiment provides a hydrogen system having an energy efficiency higher than conventional ones, as an example.

In one general aspect, the techniques disclosed here feature a hydrogen system including: a water electrolysis apparatus including a water electrolysis cell; an electrochemical hydrogen pump that increases a pressure of hydrogen-containing gas produced by the water electrolysis apparatus; a gas flow path that supplies the hydrogen-containing gas produced by the water electrolysis apparatus to the electrochemical hydrogen pump; and a first flow path through which a first heat medium that is a liquid and has collected waste heat of the water electrolysis cell flows, in which the electrochemical hydrogen pump is capable of performing heat exchange with the first heat medium having collected waste heat of the water electrolysis cell.

The present disclosure is configured as described above and provides an effect of having an energy efficiency higher than conventional ones.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
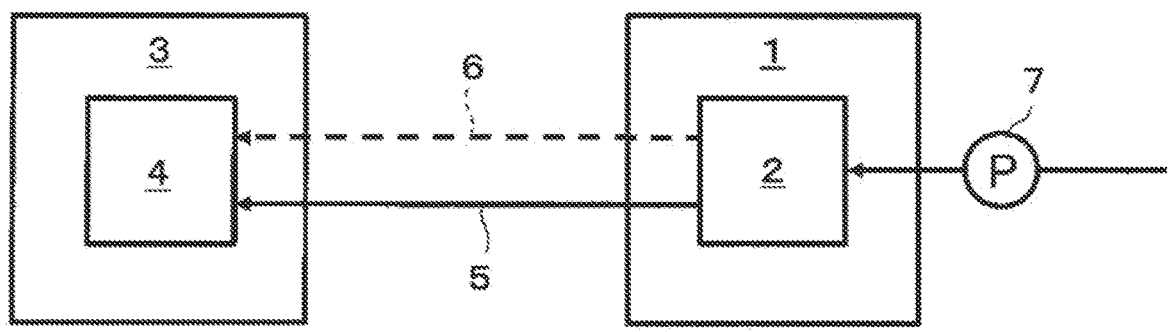
FIG. 1 is a block diagram schematically illustrating an example of a hydrogen system according to a first embodiment of the present disclosure.

How Embodiment of Present Disclosure was Obtained

For example, in an electrochemical hydrogen pump including a solid polymer electrolyte membrane (hereinafter referred to as an electrolyte membrane), hydrogen ($H_2$) on the anode side is protonated and moved to the cathode side via the electrolyte membrane. Then, the protons ($H^+$) is returned to hydrogen ($H_2$) at the cathode, and thus the pressure of the hydrogen ($H_2$) is increased. Here, the proton conductivity of an electrolyte membrane generally increases under high-temperature and high-humidity conditions (for example, at approximately 60° C.), and the efficiency of the hydrogen compression operation of the electrochemical hydrogen pump improves.

For this reason, an electrochemical hydrogen pump stack including multiple stacked membrane/electrode assemblies (MEA) is configured to be heated by a heat source as appropriate, and hence, it is necessary to supply a desired energy to this heat source. In particular, the disclosers of the present inventors have found that the amount of energy consumed by the heat source is large when the electrochemical hydrogen pump starts operation.

As described above, from the viewpoint of the aim of improving the proton conductivity and the reactivity of the electrode catalyst, a water electrolysis apparatus needs to be heated to a certain high temperature when starting operation. In this respect, Patent Literature 1 proposes a water electrolysis system in which heat exchange is performed between the water used for electrolysis in the water electrolysis stack and the heat medium (refrigerant) for cooling fuel cells to heat the water electrolysis stack when the water electrolysis apparatus starts operation.

However, in a water electrolysis apparatus, heat is generated due to overvoltage during water electrolysis. For this reason, from the viewpoint of the water electrolysis efficiency and the durability of the water electrolysis stack included in the water electrolysis apparatus, after the temperature of the water electrolysis apparatus increases from room temperature to a certain temperature (for example, 100° C.), heat generated from the water electrolysis apparatus needs to be removed.

In this respect, the inventors of the present disclosure have found that it is possible to achieve a hydrogen system having a higher energy efficiency than conventional ones by collecting waste heat generated during water electrolysis from the water electrolysis apparatus and supplying the collected waste heat to the electrochemical hydrogen pump, and thus the disclosers have come up to the present disclosure. Specifically, a configuration in which the waste heat collected from the water electrolysis apparatus is supplied to the electrochemical hydrogen pump makes it possible to utilize this waste heat as a heat source for heating the electrochemical hydrogen pump stack. For a configuration having, for example, an electric heater as a heat source for heating the electrochemical hydrogen pump stack, it is possible to reduce the amount of heat that the electric heater supplies to the electrochemical hydrogen pump stack. Accordingly, it is possible to reduce the amount of energy consumed by the electric heater.

Note that in the water electrolysis system disclosed in Patent Literature 1, such heat utilization between the water electrolysis apparatus and the electrochemical hydrogen pump is not considered.

Here, a hydrogen system according to a first aspect of the present disclosure includes: a water electrolysis apparatus including a water electrolysis cell; an electrochemical hydrogen pump that increases the pressure of hydrogen-containing gas produced by the water electrolysis apparatus; a gas flow path that supplies the hydrogen-containing gas produced by the water electrolysis apparatus to the electrochemical hydrogen pump; and a first flow path through which a first heat medium that is a liquid and has collected waste heat of the water electrolysis cell flows, and the electrochemical hydrogen pump is capable of performing heat exchange with the first heat medium having collected waste heat of the water electrolysis cell.

With the above configuration, since the electrochemical hydrogen pump can perform heat exchange with the first heat medium having collected waste heat of the water electrolysis cells, it is possible to heat the electrochemical hydrogen pump by utilizing the waste heat of the water electrolysis cell. This improves the energy efficiency of the hydrogen system compared to conventional ones.

A hydrogen system according to a second aspect of the present disclosure is the hydrogen system according to the foregoing first aspect, in which the first flow path may be arranged in such a way that the first heat medium performs heat exchange with each of the water electrolysis cell and the electrochemical hydrogen pump, and after the first heat medium collects waste heat of the water electrolysis cell, the first heat medium may perform heat exchange with the electrochemical hydrogen pump.

With the above configuration, since the first flow path is arranged in such a way that the first heat medium performs heat exchange with the water electrolysis apparatus and the electrochemical hydrogen pump, it is possible to collect waste heat from the water electrolysis cell by using the first heat medium and utilize this collected waste heat to heat the electrochemical hydrogen pump.

A hydrogen system according to a third aspect of the present disclosure is the hydrogen system according to the foregoing first aspect, in which the first heat medium may be liquid water for water electrolysis supplied to the water electrolysis apparatus.

A hydrogen system according to a fourth aspect of the present disclosure is the hydrogen system according to the foregoing first aspect, in which the first heat medium may be coolant that cools the water electrolysis cell, and the coolant may be different from liquid water for water electrolysis supplied to the water electrolysis apparatus.

A hydrogen system according to a fifth aspect of the present disclosure is the hydrogen system according to the foregoing first aspect, in which the hydrogen system may further include a gas-liquid separator provided on the gas flow path, the first heat medium may be liquid water separated from the hydrogen-containing gas by the gas-liquid separator, and one end of the first flow path may be connected to a reservoir in which liquid water in the gas-liquid separator collects.

With the above configuration, since the hydrogen system has the gas-liquid separator on the gas flow path, it is possible to effectively utilize the liquid water separated at the gas-liquid separator from the hydrogen-containing gas produced by the water electrolysis apparatus, as the first heat medium.

A hydrogen system according to a sixth aspect of the present disclosure is the hydrogen system according to the foregoing second aspect, in which the hydrogen system may further include a first cooler that cools the first heat medium having collected waste heat of the water electrolysis cell before the first heat medium performs heat exchange with the electrochemical hydrogen pump.

With the above configuration, since the hydrogen system includes the first cooler, it is possible to decrease the temperature of the first heat medium having collected waste heat generated at the water electrolysis cell to the optimum temperature by using the first cooler. Thus, heat exchange can be performed between the electrochemical hydrogen pump and the first heat medium the temperature of which has decreased to the optimum temperature, and it is possible to heat the electrochemical hydrogen pump to the optimum temperature while preventing the electrochemical hydrogen pump from overheating.

A hydrogen system according to a seventh aspect of the present disclosure is the hydrogen system according to the foregoing sixth aspect, in which the hydrogen system may further include a controller that causes the first cooler to increase a degree of cooling when the temperature of an electrochemical cell included in the electrochemical hydrogen pump increases.

With the above configuration, since the hydrogen system includes the above controller (a first controller 10 described later), it is possible to increase the degree of cooling by the first cooler using the controller based on the increase in the temperature received from the electrochemical hydrogen pump. In other words, it is possible to decrease the temperature of the first heat medium according to the temperature increase of the electrochemical cell included in the electrochemical hydrogen pump.

Thus, it is possible to control the temperature of the first heat medium in such a way that the electrochemical hydrogen pump is at the optimum temperature for operating with high efficiency.

A hydrogen system according to an eighth aspect of the present disclosure is the hydrogen system according to the foregoing fifth aspect, in which the hydrogen system may further include a second cooler that cools the hydrogen-containing gas flowing through the gas flow path upstream of the gas-liquid separator or the hydrogen-containing gas flowing inside the gas-liquid separator.

With the above configuration, since the hydrogen system has the gas-liquid separator on the gas flow path, it is possible to effectively utilize the liquid water separated at the gas-liquid separator from the hydrogen-containing gas produced by the water electrolysis apparatus, as the first heat medium.

In addition, it is possible to decrease the temperature of the hydrogen-containing gas having collected waste heat generated at the water electrolysis cell to the optimum temperature using the second cooler. Thus, heat exchange can be performed between the electrochemical hydrogen pump and the hydrogen-containing gas the temperature of which has decreased to the optimum temperature, and it is possible to heat the electrochemical hydrogen pump to the optimum temperature while preventing the electrochemical hydrogen pump from overheating.

A hydrogen system according to a ninth aspect of the present disclosure is the hydrogen system according to the foregoing eighth aspect, in which the hydrogen system may further include a controller that increases the degree of cooling by the second cooler when the temperature of an electrochemical cell included in the electrochemical hydrogen pump increases.

With the above configuration, since the hydrogen system includes the above controller (a second controller 12 described later), it is possible to increase the degree of cooling by the second cooler using the controller based on the increase in the temperature received from the electrochemical hydrogen pump. In other words, it is possible to decrease the temperature of the hydrogen-containing gas to a desired temperature, according to the increase in the temperature of the electrochemical cell included in the electrochemical hydrogen pump.

Thus, it is possible to control the temperature of the hydrogen-containing gas in such a way that the electrochemical hydrogen pump can be at the optimum temperature for operating with high efficiency.

A hydrogen system according to a tenth aspect of the present disclosure is the hydrogen system according to the foregoing first aspect, in which the hydrogen system may further include: a first cooler that cools the first heat medium having collected waste heat of the water electrolysis cell before the first heat medium performs heat exchange with the electrochemical hydrogen pump; a first branch path that branches off from the first flow path, passes through the first cooler, and merges into the first flow path; and a first flow-rate controller that controls the flow rate of the first heat medium flowing into the first branch path.

In the above configuration, the first heat medium flowing through the first flow path without being cooled by the first cooler and the first heat medium that branches off from the first flow path, flows through the first branch path, and is cooled by the first cooler merge into the first flow path. This configuration makes it possible to control the temperature of the first heat medium in such a way that the electrochemical hydrogen pump can be at the optimum temperature for operating with high efficiency.

A hydrogen system according to an eleventh aspect of the present disclosure is the hydrogen system according to the foregoing tenth aspect, in which the hydrogen system may further include a controller that, when the temperature of an electrochemical cell included in the electrochemical hydrogen pump increases, causes the first flow-rate controller to increase the flow rate of the first heat medium flowing into the first branch path.

With the above configuration, since the hydrogen system includes the above controller (a third controller 14 described later), it is possible to increase the flow rate of the first heat medium flowing into the first branch path using the first flow-rate controller, according to the increase in the temperature of the electrochemical cell included in the electrochemical hydrogen pump. In this manner, it is possible to decrease the temperature of the first heat medium using the first cooler according to the increase in the amount of heat generated in the electrochemical hydrogen pump. Thus, it is possible to control the temperature of the first heat medium in such a way that the electrochemical hydrogen pump is at the optimum temperature for operating with high efficiency.

A hydrogen system according to a twelfth aspect of the present disclosure is the hydrogen system according to the foregoing fifth aspect, in which the hydrogen system may further include: a gas branch path that branches off from the gas flow path of the gas-liquid separator and merges into the gas flow path downstream of the position where the gas branch path branches off and upstream of the gas-liquid separator; a second cooler that cools the hydrogen-containing gas flowing through the gas branch path; and a gas flow-rate controller that controls the flow rate of the hydrogen-containing gas flowing into the gas branch path.

In the above configuration, the hydrogen-containing gas flowing through the gas flow path without being cooled by the second cooler and the hydrogen-containing gas that branches off from the gas flow path, flows through the gas branch path, and is cooled by the second cooler merges into the gas flow path. Thus, it is possible to control the temperature of the hydrogen-containing gas in such a way that the electrochemical hydrogen pump can be at the optimum temperature for operating with high efficiency.

A hydrogen system according to a thirteenth aspect of the present disclosure is the hydrogen system according to the foregoing twelfth aspect, in which the hydrogen system may further include a controller that, when the temperature of an electrochemical cell included in the electrochemical hydrogen pump increases, causes the gas flow-rate controller to increase the flow rate of the hydrogen-containing gas flowing into the gas branch path.

With the above configuration, since the hydrogen system includes the controller (a fourth controller 17 described later), it is possible to increase the flow rate of the hydrogen-containing gas flowing into the gas branch path using the gas flow-rate controller, according to the increase in the temperature of the electrochemical cell included in the electrochemical hydrogen pump. In this manner, it is possible to decrease the temperature of the hydrogen-containing gas using the second cooler according to the increase in the amount of heat generated in the electrochemical hydrogen pump. Thus, it is possible to control the temperature of the hydrogen-containing gas in such a way that the electrochemical hydrogen pump can be at the optimum temperature for operating with high efficiency.

A hydrogen system according to a fourteenth aspect of the present disclosure is the hydrogen system according to the foregoing second aspect, in which the hydrogen system may further include: a back-flow path that branches off from the first flow path and returns to the water electrolysis apparatus; a back-flow-rate controller that controls the flow rate of the first heat medium flowing into the back-flow path; and a controller that controls the back-flow-rate controller.

With the above configuration, since the hydrogen system includes the above controller (a fifth controller 20 described later), it is possible to increase or decrease the flow rate of the first heat medium flowing into the back-flow path appropriately according to the use state of the electrochemical hydrogen pump and the water electrolysis apparatus by using the back-flow-rate controller.

A hydrogen system according to a fifteenth aspect of the present disclosure is the hydrogen system according to the foregoing fourteenth aspect, in which when the water electrolysis apparatus performs water electrolysis, and the electrochemical hydrogen pump is not started operation, the controller may cause the back-flow-rate controller to control the flow rate of the first heat medium flowing through the back-flow path to be higher than the flow rate of the first heat medium flowing through the first flow path downstream of the branch point at which the back-flow path branches off.

With the above configuration, when the water electrolysis apparatus performs water electrolysis, and the electrochemical hydrogen pump is not started operation, the back-flow-rate controller makes the flow rate of the first heat medium flowing into the back-flow path higher than the flow rate of the first heat medium flowing through the first flow path downstream of the branch point at which the back-flow path branches off, and this prevents useless heat supply to the electrochemical hydrogen pump.

A hydrogen system according to a sixteenth aspect of the present disclosure is the hydrogen system according to the foregoing fourteenth aspect, in which when the water electrolysis apparatus performs water electrolysis, and the electrochemical hydrogen pump is started operation, the controller may cause the back-flow-rate controller to control the flow rate of the first heat medium flowing through the first flow path downstream of the branch point at which the back-flow path branches off to be higher than the flow rate of the first heat medium flowing through the back-flow path.

With the above configuration, when the water electrolysis apparatus performs water electrolysis, and the electrochemical hydrogen pump is started operation, the back-flow-rate controller makes the flow rate of the first heat medium flowing through the first flow path downstream of the branch point at which the back-flow path branches off higher than the flow rate of the first heat medium flowing into the back-flow path, and this makes it easy to heat the electrochemical hydrogen pump, utilizing waste heat of the water electrolysis cell.

A hydrogen system according to a seventeenth aspect of the present disclosure is the hydrogen system according to the foregoing fourteenth aspect, in which when the temperature of an electrochemical cell included in the electrochemical hydrogen pump increases, the controller may cause the back-flow-rate controller to increase the flow rate of the first heat medium flowing through the back-flow path.

With the above configuration, since the flow rate of the first heat medium flowing into the back-flow path is increased according to the increase in the amount of heat generated at the electrochemical hydrogen pump, it is possible to decrease the degree of heating for the electrochemical hydrogen pump by the first heat medium flowing through the first flow path downstream of the branch point at which the back-flow path branches off. Thus, it is possible to control the flow rate of the first heat medium flowing into the electrochemical hydrogen pump in such a way that the electrochemical hydrogen pump can be at the optimum temperature for operating with high efficiency.

A hydrogen system according to an eighteenth aspect of the present disclosure is the hydrogen system according to the foregoing fourteenth aspect, in which the hydrogen system may further include a third cooler that cools the first heat medium flowing through the back-flow path.

With the above configuration, since the first heat medium can be cooled with the third cooler appropriately when the first heat medium flows through the back-flow path, it is possible to keep the temperature of the water electrolysis apparatus at an appropriate temperature by the temperature control of the first heat medium flowing through the back-flow path.

A hydrogen system according to a nineteenth aspect of the present disclosure is the hydrogen system according to the foregoing fourteenth aspect, in which the hydrogen system may further include a first cooler that cools the first heat medium having collected waste heat of the water electrolysis cell before the first heat medium performs heat exchange with the electrochemical hydrogen pump, and the back-flow path may branch off from the first flow path downstream of the first cooler.

With the above configuration, it is possible to cool the first heat medium appropriately with the first cooler when the first heat medium flows through the first flow path upstream of the branch point of the back-flow path. Thus, it is possible to decrease the temperature of the first heat medium by increasing the degree of cooling by the first cooler, according to the increase in the amount of heat generated at the electrochemical hydrogen pump. Thus, it is possible to control the temperature of the first heat medium in such a way that the electrochemical hydrogen pump can be at the optimum temperature for operating with high efficiency.

A hydrogen system according to a twentieth aspect of the present disclosure is the hydrogen system according to the foregoing sixth aspect, in which the first cooler may be a first thermal storage that stores heat collected from the first heat medium.

With the above configuration, since waste heat collected by the first heat medium from the water electrolysis apparatus can be stored in the first thermal storage, it is possible to utilize heat from the first thermal storage in the hydrogen system as necessary at appropriate times.

A hydrogen system according to a twenty-first aspect of the present disclosure is the hydrogen system according to the foregoing first aspect, in which the hydrogen system may further include a first deliverer that delivers the first heat medium to the first flow path, and the first deliverer may be caused to start operation when the electrochemical hydrogen pump starts operation.

With the above configuration, since the hydrogen system includes the first deliverer, it is possible to run the first heat medium through the first flow path at the same time when the electrochemical hydrogen pump starts operation. This makes it possible to heat the electrochemical hydrogen pump to the optimum temperature at the time when the electrochemical hydrogen pump starts operation by utilizing the heat of the first heat medium having collected waste heat of the water electrolysis cell.

A hydrogen system according to a twenty-second aspect of the present disclosure is the hydrogen system according to the foregoing first aspect, in which the hydrogen system may further include a heat exchanger at which heat exchange is performed between the first heat medium and a second heat medium that is a liquid; a second flow path through which the second heat medium flows, and the second heat medium may perform heat exchange with the electrochemical hydrogen pump after performing heat exchange at the heat exchanger.

With the above configuration, since the hydrogen system includes the second flow path, it is possible to give part of the waste heat collected by the first heat medium from the water electrolysis apparatus to the electrochemical hydrogen pump via the second heat medium. Thus, waste heat of the water electrolysis cell can be utilized to heat the electrochemical hydrogen pump, and this improves the energy efficiency of the hydrogen system compared to conventional ones.

A hydrogen system according to a twenty-third aspect of the present disclosure is the hydrogen system according to the foregoing twenty-second aspect, in which the heat exchanger may be a second thermal storage that stores the second heat medium.

With the above configuration, the second heat medium having collected waste heat of the water electrolysis cell can be stored in the second thermal storage, and thus, the heat that the second heat medium in the second thermal storage has can be utilized to heat the electrochemical hydrogen pump as necessary at appropriate times by circulating the second heat medium.

A hydrogen system according to a twenty-fourth aspect of the present disclosure is the hydrogen system according to the foregoing twenty-second aspect, in which the heat exchanger may be a third thermal storage that stores a third heat medium, and the first flow path and the second flow path may be configured to perform heat exchange with the third heat medium.

With the above configuration, the third heat medium having collected waste heat of the water electrolysis cell can be stored in the third thermal storage, and thus, the heat that the third heat medium in the third thermal storage has can be utilized to heat the electrochemical hydrogen pump as necessary at appropriate times by circulating the third heat medium.

A hydrogen system according to a twenty-fifth aspect of the present disclosure is the hydrogen system according to the foregoing twenty-second aspect, in which the hydrogen system may further include a second deliverer that is provided on the second flow path and delivers the second heat medium; and a controller that causes the second deliverer to start operation when the electrochemical hydrogen pump starts operation.

With the above configuration, since the hydrogen system includes the second deliverer and the controller (a sixth controller 25 described later), it is possible to run the second heat medium through the second flow path at the same time when the electrochemical hydrogen pump starts operation. This makes it possible for the second heat medium to heat the electrochemical hydrogen pump by utilizing the heat that the second heat medium has obtained from the heat exchange with the first heat medium in such a way the electrochemical hydrogen pump can be at the optimum temperature when the electrochemical hydrogen pump starts operation. Thus, it is possible to increase the temperature of the electrochemical hydrogen pump to a temperature at which the electrochemical hydrogen pump can perform pressure increasing operation with high efficiency.

A hydrogen system according to a twenty-sixth aspect of the present disclosure is the hydrogen system according to the foregoing twenty-second aspect, in which the hydrogen system may further include: a bypass flow path that bypasses the heat exchanger and through which the first heat medium flows; a second flow-rate controller that controls the flow rate of the first heat medium flowing through the bypass flow path; and a controller that, when the temperature of an electrochemical cell included in the electrochemical hydrogen pump increase, causes the second flow-rate controller to increase the flow rate of the first heat medium flowing through the bypass flow path.

With the above configuration, since the hydrogen system further includes the bypass flow path and the second flow-rate controller, it is possible to adjust the amount of heat that the first heat medium has by adjusting the flow rate of the first heat medium flowing through the bypass flow path. In addition, since the hydrogen system includes the controller (the sixth controller 25 described later), it is possible to increase the flow rate of the first heat medium flowing through the bypass flow path according to the increase in the temperature of the electrochemical cell included in the electrochemical hydrogen pump by using the second flow-rate controller. In other words, it is possible to decrease the amount of heat that the second heat medium obtains from the first heat medium via the heat exchanger, according to the increase in the temperature of the electrochemical hydrogen pump.

Thus, it is possible to heat the electrochemical hydrogen pump to a temperature that enables the electrochemical hydrogen pump to operate with high efficiency.

A hydrogen system according to a twenty-seventh aspect of the present disclosure is the hydrogen system according to the foregoing first aspect, in which the hydrogen system may further include a tank that is provided on the gas flow path and stores the hydrogen-containing gas.

The configuration above makes it possible to store the hydrogen-containing gas produced in the water electrolysis apparatus in the tank and supply the hydrogen-containing gas to the electrochemical hydrogen pump as necessary as necessary at appropriate times.

A hydrogen system according to a twenty-eighth aspect of the present disclosure is the hydrogen system according to the foregoing first aspect, in which the hydrogen system may further include a fuel cell provided on the gas flow path downstream of the electrochemical hydrogen pump.

With the above configuration, it is possible to generate power by the fuel cell as necessary at appropriate times using the hydrogen-containing gas from the electrochemical hydrogen pump.

Hereinafter, embodiments of the present disclosure will be described with reference to the drawings. Note that in the following, the same or corresponding constituent members are denoted by the same reference signs throughout all the drawings, and description thereof may be omitted.

First Embodiment

First, a hydrogen system 100 according to a first embodiment of the present disclosure will be described with reference to FIG. 1. FIG. 1 is a block diagram schematically illustrating an example of the hydrogen system 100 according to the first embodiment of the present disclosure. In FIG. 1, the flow of a heat medium (first heat medium) between a water electrolysis apparatus 1 and an electrochemical hydrogen pump 3 included in the hydrogen system 100 is indicated by a solid line arrow, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted.

As illustrated in FIG. 1, the hydrogen system 100 includes the water electrolysis apparatus 1 including water electrolysis cells, the electrochemical hydrogen pump 3, a first flow path 5 through which the liquid first heat medium having collected waste heat of the water electrolysis cells flows, and a gas flow path 6 through which the hydrogen-containing gas produced in the water electrolysis apparatus 1 is supplied to the electrochemical hydrogen pump 3.

The water electrolysis apparatus 1 includes a water electrolysis stack 2 having a stack of multiple water electrolysis cells. The water electrolysis stack 2 is a device that receives a voltage greater than or equal to a specified voltage applied by a voltage application unit (not illustrated) and electrolyzes the water supplied from the outside of the system to produce a hydrogen-containing gas at the cathode and an oxygen-containing gas at the anode. Note that the water electrolysis technique implemented in the water electrolysis apparatus 1 is not limited to any specific ones, but examples thereof include alkaline water electrolysis, solid polymer water electrolysis, and high-temperature water electrolysis. The water electrolysis stack 2 supplies the hydrogen-containing gas produced at the cathode to the electrochemical hydrogen pump 3 through the gas flow path 6.

The electrochemical hydrogen pump 3 is a device that increases the pressure of the hydrogen-containing gas produced in the water electrolysis apparatus 1. The electrochemical hydrogen pump 3 includes an electrochemical hydrogen pump stack 4 having a stack of multiple electrochemical cells. For example, the electrochemical hydrogen pump 3 may be an electrochemical pressure booster including electrolyte membranes. In this case, the electrochemical hydrogen pump stack 4, receiving a voltage applied by a voltage application unit (not illustrated), protonates hydrogen ($H_2$) in the hydrogen-containing gas supplied from the water electrolysis stack 2 and moves the protons from the anode through the electrolyte to the cathode. The electrochemical hydrogen pump stack 4 then converts the protons ($H^+$) into hydrogen ($H_2$) at the cathode and thereby compresses the hydrogen-containing gas to increase the pressure.

Note that in the case where the voltage application unit is connected to a DC power supply such as a battery, solar cells, and fuel cells, the voltage application unit includes a DC/DC converter, and in the case where the voltage application unit is connected to an AC power supply such as a commercial power supply, the voltage application unit includes an AC/DC converter. In addition, the voltage application unit may be, for example, a power supply of an electric-power type capable of adjusting the voltage applied between the anode and the cathode and the current flowing between the anode and the cathode so that the electric power supplied to the electrochemical hydrogen pump 3 can be at a specified set value.

The first flow path 5 is a flow path through which the first heat medium that collects waste heat of the water electrolysis cells in the water electrolysis apparatus 1 flows. In the hydrogen system 100 according to the first embodiment of the present disclosure, the first flow path 5 is arranged in such a way that the first heat medium performs heat exchange with each of the water electrolysis stack 2 in the water electrolysis apparatus 1 and the electrochemical hydrogen pump stack 4 in the electrochemical hydrogen pump 3. The first heat medium flowing through the first flow path 5 collects waste heat of the water electrolysis cells in the water electrolysis apparatus 1 and then performs heat exchange with the electrochemical hydrogen pump stack 4 in the electrochemical hydrogen pump 3 to heat the electrochemical hydrogen pump stack 4.

Note that the heat exchange between the first heat medium and the electrochemical hydrogen pump stack 4 may be performed directly between the first heat medium and the electrochemical hydrogen pump stack 4, for example, in such a way that the first heat medium flows between the cells of the electrochemical hydrogen pump stack 4. Alternatively, heat exchange may be performed indirectly between the first heat medium and the electrochemical hydrogen pump stack 4 via another heat medium different from the first heat medium.

The first heat medium is delivered by a first deliverer 7 and flows inside the first flow path 5. The first deliverer 7 may be, for example, a device such as a mass flow controller or a pressure booster that controls the flow rate of fluid or may be a flow-rate adjustment valve in the case where the first heat medium is originally pressurized. The first heat medium may be liquid water for water electrolysis that is supplied to the water electrolysis apparatus 1 or may be liquid different from this water for water electrolysis. For example, the first heat medium may be coolant for cooling the water electrolysis cells, and the coolant may be liquid different from liquid water for water electrolysis that is supplied to the water electrolysis apparatus 1. An example of such coolant is water.

Note that the time at which the first heat medium is delivered to the water electrolysis stack 2 to collect waste heat of the water electrolysis cells may be the same as the time at which water electrolysis is performed in the water electrolysis stack 2, and the temperature of the water electrolysis stack 2 increases to a specified temperature. The time at which the heat exchange is performed between the first heat medium having collected waste heat and the electrochemical hydrogen pump stack 4 may be, for example, at the time when the electrochemical hydrogen pump 3 starts operation. In this case, operation of the first deliverer 7 is started when the electrochemical hydrogen pump 3 starts operation. With this operation, it is possible to run the first heat medium through the first flow path 5 at the same time as the time when the electrochemical hydrogen pump 3 starts operation. This makes it possible to heat the electrochemical hydrogen pump 3 by utilizing the heat of the first heat medium having collected waste heat of the water electrolysis cells so that the electrochemical hydrogen pump 3 can be at the optimum temperature when it starts operation.

Note that the time of the heat exchange between the first heat medium having collected waste heat and the electrochemical hydrogen pump stack 4 is not necessarily limited to the time when the electrochemical hydrogen pump 3 starts operation. For example, heat exchange between the first heat medium having collected waste heat and the electrochemical hydrogen pump stack 4 may start before the electrochemical hydrogen pump 3 starts operation, and the electrochemical hydrogen pump stack 4 may be heated before it starts operation.

As has been described above, since heat exchange can be performed in this configuration between the first heat medium having collected waste heat by heat exchange with the water electrolysis stack 2 and the electrochemical hydrogen pump stack 4, it is possible to utilize the waste heat of the water electrolysis cells to heat the electrochemical hydrogen pump stack 4. Accordingly, the hydrogen system 100 has a higher energy efficiency than conventional ones.

Modification of First Embodiment

Figure 2:
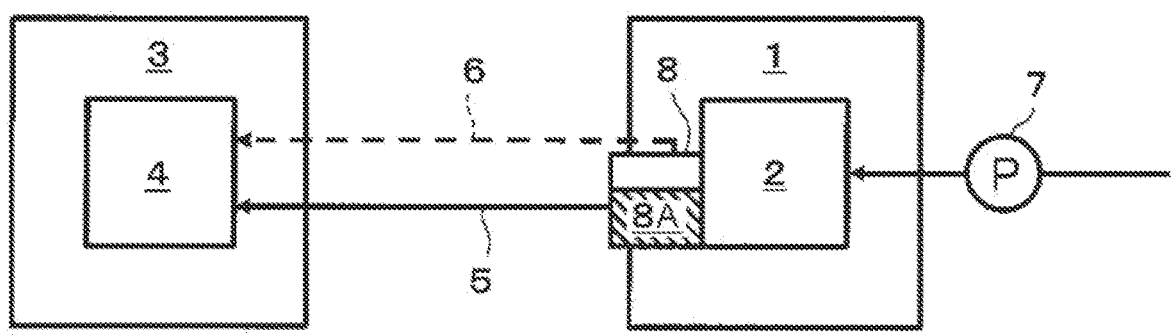
FIG. 2 is a block diagram schematically illustrating an example of a hydrogen system according to a modification of the first embodiment of the present disclosure.

Next, a modification of the first embodiment of the present disclosure will be described with reference to FIG. 2. FIG. 2 is a block diagram schematically illustrating an example of a hydrogen system 100A according to the modification of the first embodiment of the present disclosure.

The hydrogen system 100A according to the present modification further includes a gas-liquid separator 8 in addition to the configuration of the hydrogen system 100 according to the first embodiment. Specifically, the gas-liquid separator 8 is provided on the gas flow path 6.

A first heat medium is liquid water separated from the hydrogen-containing gas in the gas-liquid separator 8, and one end of the first flow path 5 is connected to a reservoir 8A in which the liquid water in the gas-liquid separator 8 collects. Specifically, the first heat medium is liquid water and water vapor in the hydrogen-containing gas that has performed heat exchange with the water electrolysis cells and has collected waste heat generated at the water electrolysis cells. After that, the first heat medium having collected waste heat flows through the first flow path 5 connecting the gas-liquid separator 8 and the electrochemical hydrogen pump 3.

As has been described above, since the hydrogen system 100A has the gas-liquid separator 8 provided on the gas flow path 6, it is possible to effectively utilize the liquid water separated in the gas-liquid separator 8 from the hydrogen-containing gas produced in the water electrolysis apparatus 1, as the first heat medium.

Except the above feature, the hydrogen system 100A according to the present modification may be the same as or similar to the hydrogen system according to the first embodiment.

Second Embodiment

Figure 3:
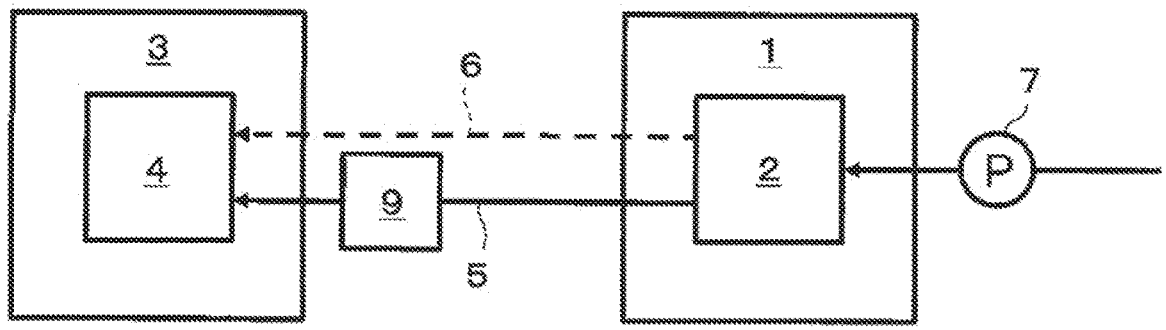
FIG. 3 is a block diagram schematically illustrating an example of a hydrogen system according to a second embodiment of the present disclosure.

Next, a second embodiment of the present disclosure will be described with reference to FIG. 3. FIG. 3 is a block diagram schematically illustrating an example of a hydrogen system 101 according to the second embodiment of the present disclosure. In FIG. 3, the flow of a heat medium (first heat medium) between a water electrolysis apparatus 1 and an electrochemical hydrogen pump 3 included in the hydrogen system 101 is indicated by a solid line arrow, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted.

The hydrogen system 101 according to the second embodiment further includes a cooler 9 in addition to the configuration of the hydrogen system 100 according to the first embodiment. Specifically, the hydrogen system 101, the cooler 9 that cools the first heat medium having collected waste heat of the water electrolysis cells before the heat exchange between the first heat medium and the electrochemical hydrogen pump 3 is provided on the first flow path 5. Examples of the cooler 9 include a radiator (heat dissipator) and a chiller, but the cooler 9 is not limited to these examples. For example, the cooler 9 may be a thermal storage that stores heat collected from the first heat medium. This configuration makes it possible to store waste heat collected by the first heat medium from the water electrolysis apparatus in the thermal storage and utilize the heat from the thermal storage in the hydrogen system 101 as necessary at appropriate times. Examples of such a thermal storage include a hot-water storage tank provided with a pipe serving as the first flow path 5. Specifically, heat of the first heat medium flowing through this pipe is given to the water inside the hot-water storage tank, and thereby the first heat medium is cooled.

The first heat medium performs heat exchange with the water electrolysis stack 2 and collects waste heat generated at the water electrolysis cells. After that, the first heat medium having collected the waste heat flows through the first flow path 5 connecting the water electrolysis apparatus 1 and the electrochemical hydrogen pump 3 and is cooled when the first heat medium passes through the cooler 9 provided on the first flow path 5.

Meanwhile, in the electrochemical hydrogen pump 3, as the pressure compressing hydrogen increases, overvoltage generated at the electrochemical cells included in the electrochemical hydrogen pump stack 4 also increases. Accordingly, as the pressure compressing hydrogen increases, the temperature of the electrochemical hydrogen pump stack 4 increases. Here, when the electrochemical hydrogen pump 3 overheats, it causes a problem that the cathode side of the electrochemical hydrogen pump stack 4 gets dried, hindering the movement of protons.

As above, as the pressure compressing hydrogen increases in the electrochemical hydrogen pump 3, its temperature increases, but the amount of heat of the waste heat generated in the water electrolysis apparatus 1 is constant. Hence, it is necessary to reduce the amount of heat that the first heat medium has, as necessary, to reduce the amount of heat used to heat the electrochemical hydrogen pump 3 in heat exchange between the electrochemical hydrogen pump 3 and this first heat medium.

Since the hydrogen system 101 according to the second embodiment includes the cooler 9, it is possible to decrease the temperature of the first heat medium having collected waste heat generated at the water electrolysis cells to the optimum temperature by using the cooler 9. Thus, heat exchange can be performed between the electrochemical hydrogen pump 3 and the first heat medium the temperature of which has decreased to the optimum temperature, making it possible to heat the electrochemical hydrogen pump 3 to the optimum temperature while preventing the electrochemical hydrogen pump 3 from overheating.

Figure 4:
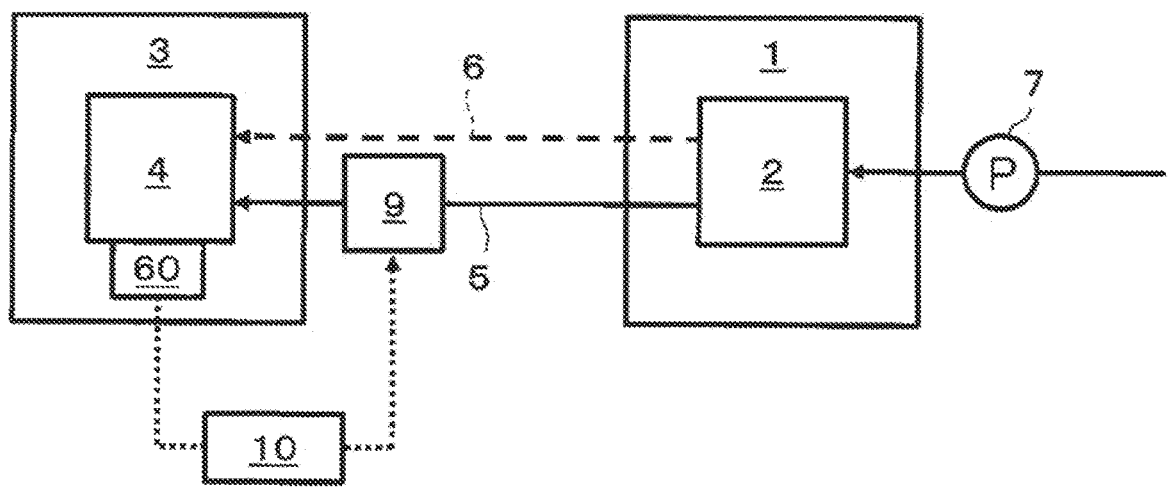
FIG. 4 is a block diagram schematically illustrating an example of a configuration related to temperature control of a first heat medium in the hydrogen system according to the second embodiment of the present disclosure.

Next, the temperature control of the first heat medium will be described with reference to FIG. 4. FIG. 4 is a block diagram schematically illustrating an example of a configuration related to temperature control of the first heat medium in the hydrogen system 101 according to the second embodiment of the present disclosure. As illustrated in FIG. 4, the hydrogen system 101 further includes a first controller 10 (controller) that controls the degree of cooling by the cooler 9, in addition to the configuration illustrated in FIG. 3. Note that also in FIG. 4 as in FIG. 3, the flow of the heat medium (first heat medium) between the water electrolysis apparatus 1 and the electrochemical hydrogen pump 3 included in the hydrogen system 101 is indicated by a solid line arrow, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted. In addition, the flow of signals indicating the temperature of the electrochemical cells included in the electrochemical hydrogen pump 3 and control signals transmitted to the cooler 9 is indicated by an arrow with thin dashed lines. Although this example has a temperature detector 60 as an example of a detector that detects temperature, the detector is not limited to this example. The detector that detects the temperature of the electrochemical cells may be one that directly detects the temperature of the electrochemical cells as the above temperature detector 60 or may be one that detects a parameter having correlation with the temperature of the electrochemical cells. The detector that detects a parameter having correlation with the temperature of the electrochemical cells may be, for example, one that detects the value of increased pressure of the electrochemical hydrogen pump 3.

When the temperature of the electrochemical cells included in the electrochemical hydrogen pump 3 increases, the first controller 10 controls the cooler 9 to increase the degree of cooling by the cooler 9. The first controller 10 includes a calculation processor and a storage that stores a control program. Examples of the calculation processor include an MPU and a CPU. Examples of the storage include memory. The first controller 10 may be a single controller that performs centralized control or may be multiple controllers that cooperate with one another to perform distributed control.

Note that in the case where the temperature of the electrochemical cells is measured, for example, by the temperature detector 60, the first controller 10 can receive this temperature as a signal (for example, a voltage) transmitted from the temperature detector 60. When the first controller 10 determines that the temperature has increased, the first controller 10 transmits a control signal to the cooler 9 to control the degree of cooling by the cooler 9.

Meanwhile, the above value of increased pressure having correlation with the temperature of the electrochemical cells is information on the pressure value of hydrogen the pressure of which has been increased by the electrochemical hydrogen pump 3, and the first controller 10 can obtain this value of increased pressure, for example, as a signal (for example, a voltage) transmitted from a detector that measures the pressure value of hydrogen the pressure of which has been increased. When the first controller 10 determines that the value of increased pressure has increased, the first controller 10 transmits a control signal to the cooler 9 to control the degree of cooling by the cooler 9.

Thus, in the hydrogen system 101 according to the second embodiment, it is possible to increase the degree of cooling by the cooler 9 by using the first controller 10, based on the increase in the temperature received from the electrochemical hydrogen pump 3. In other words, it is possible to decrease the temperature of the first heat medium according to the increase in the temperature of the electrochemical cells included in the electrochemical hydrogen pump 3.

Thus, it is possible to control the temperature of the first heat medium in such a way that the electrochemical hydrogen pump 3 can be at the optimum temperature for operating with high efficiency.

Except the above feature, the hydrogen system 101 according to the present embodiment may be the same as or similar to the hydrogen system according to the first embodiment or the modification of the first embodiment.

Third Embodiment

Figure 5:
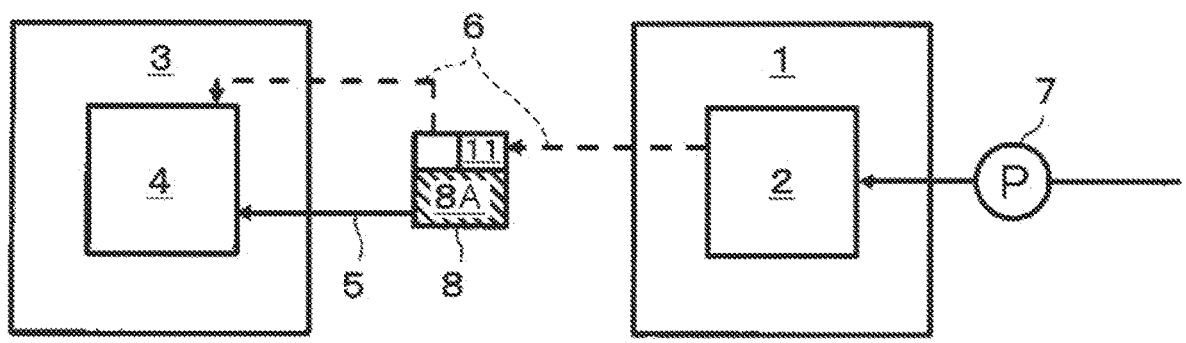
FIG. 5 is a block diagram schematically illustrating an example of a hydrogen system according to a third embodiment of the present disclosure.

Next, a third embodiment of the present disclosure will be described with reference to FIG. 5. FIG. 5 is a block diagram schematically illustrating an example of a hydrogen system 102 according to the third embodiment of the present disclosure. In FIG. 5, the flow of a heat medium (first heat medium) between a water electrolysis apparatus 1 and an electrochemical hydrogen pump 3 included in the hydrogen system 102 is indicated by a solid line arrow, and the flow of hydrogen-containing gas produced by electrolysis of water in the water electrolysis apparatus 1 is indicated by dashed line arrows. Note that the illustration of the flow of the water that is electrolyzed by the water electrolysis apparatus 1 is omitted.

The hydrogen system 102 according to the third embodiment further includes a cooler 11 in addition to the configuration of the hydrogen system 100A according to the modification of the first embodiment. Specifically, the cooler 11 is an apparatus that cools the hydrogen-containing gas flowing through a gas flow path 6 upstream of a gas-liquid separator 8 or the hydrogen-containing gas flowing inside the gas-liquid separator 8. Note that although in FIG. 5 (the same is true of FIG. 6), the cooler 11 is illustrated in such a way that the cooler 11 cools the hydrogen-containing gas flowing inside the gas-liquid separator 8, the cooler 11 may be provided on the gas flow path 6 upstream of the gas-liquid separator 8. Examples of the cooler 11 include a radiator (heat dissipater) and a chiller.

The first heat medium is liquid water separated from the hydrogen-containing gas in the gas-liquid separator 8 by the cooler 11 cooling the hydrogen-containing gas, and one end of the first flow path 5 is connected to a reservoir 8A in which the liquid water in the gas-liquid separator 8 collects. In other words, the first heat medium is liquid water and water vapor in the hydrogen-containing gas that has performed heat exchange with the water electrolysis cells and collected waste heat generated at the water electrolysis cells. After that, the first heat medium having collected waste heat flows through the first flow path 5 connecting the gas-liquid separator 8 and the electrochemical hydrogen pump 3.

Meanwhile, in the electrochemical hydrogen pump 3, as the pressure compressing hydrogen increases, overvoltage generated at electrochemical cells included in the electrochemical hydrogen pump stack 4 also increases. Accordingly, as the pressure compressing hydrogen increases, the temperature of the electrochemical hydrogen pump stack 4 increases. Here, when the temperature of the electrochemical hydrogen pump 3 overheats, it causes a problem that the cathode side of the electrochemical hydrogen pump stack 4 gets dried, hindering the movement of protons.

As above, as the pressure compressing hydrogen increases in the electrochemical hydrogen pump 3, its temperature increases, but the amount of heat of the waste heat generated in the water electrolysis apparatus 1 is constant. Hence, it is necessary to reduce the amount of heat that the hydrogen-containing gas has, as necessary, to reduce the amount of heat used to heat the electrochemical hydrogen pump 3 in heat exchange between the electrochemical hydrogen pump 3 and this hydrogen-containing gas.

In this respect, the hydrogen system 102 includes the cooler 11 and is capable of decreasing the temperature of the liquid water stored in the reservoir 8A to the optimum temperature with the cooler 11. Thus, heat exchange can be performed between the electrochemical hydrogen pump 3 and the liquid water the temperature of which has decreased to the optimum temperature and that is stored in the reservoir 8A, and it is possible to heat the electrochemical hydrogen pump 3 to the optimum temperature while preventing the electrochemical hydrogen pump 3 from overheating.

Figure 6:
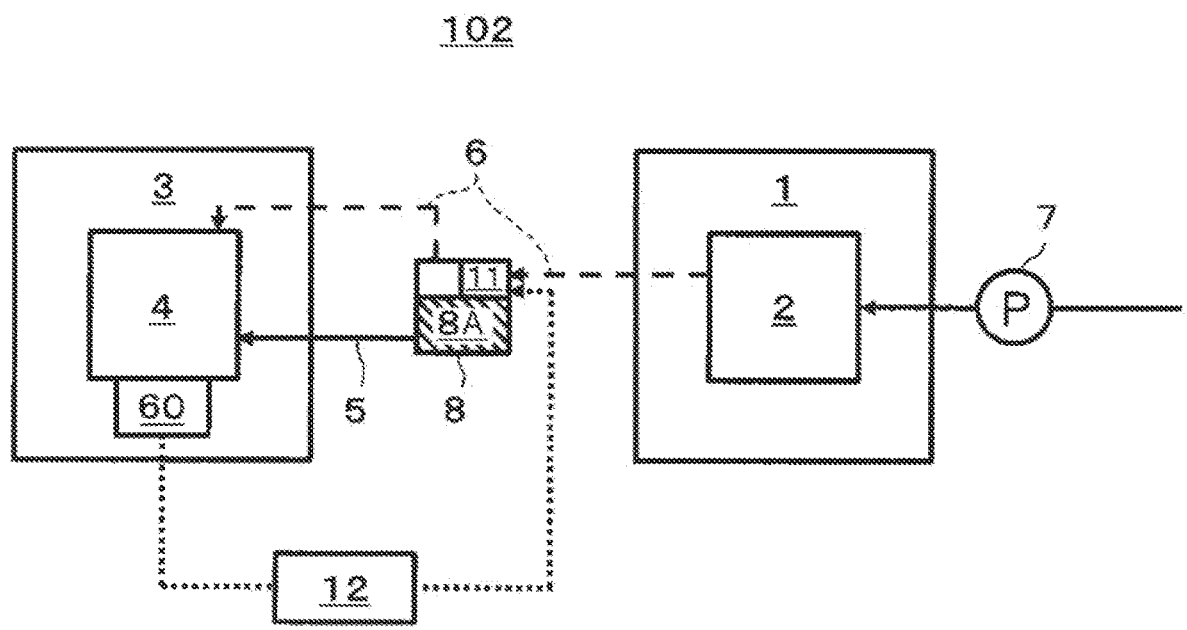
FIG. 6 is a block diagram schematically illustrating an example of a configuration related to temperature control of a first heat medium in the hydrogen system according to the third embodiment of the present disclosure.

Next, the temperature control of the hydrogen-containing gas will be described with reference to FIG. 6. FIG. 6 is a block diagram schematically illustrating an example of a configuration related to temperature control of the first heat medium in the hydrogen system 102 according to the third embodiment of the present disclosure. As illustrated in FIG. 6, the hydrogen system 102 further includes a second controller 12 (controller) that controls the degree of cooling by the cooler 11, in addition to the configuration illustrated in FIG. 5. Also in FIG. 6 as in FIG. 5, the flow of the heat medium (first heat medium) between the water electrolysis apparatus 1 and the electrochemical hydrogen pump 3 included in the hydrogen system 102 is indicated by a solid line arrow, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted. In addition, the flow of signals indicating the temperature of the electrochemical cells included in the electrochemical hydrogen pump 3 and control signals transmitted to the cooler 11 is indicated by an arrow with thin dashed lines. Although in this example, a temperature detector 60 is used as an example of a detector that detects temperature, the detector is not limited to this example. The detector that detects the temperature of the electrochemical cells may be one that directly detects the temperature of the electrochemical cells as the above temperature detector 60 or may be one that detects a parameter having correlation with the temperature of the electrochemical cells. The detector that detects a parameter having correlation with the temperature of the electrochemical cells may be, for example, one that detects the value of increased pressure of the electrochemical hydrogen pump 3.

When the temperature of the electrochemical cells included in the electrochemical hydrogen pump 3 increases, the second controller 12 controls the cooler 11 to increase the degree of cooling by the cooler 11, The second controller 12 includes a calculation processor and a storage that stores a control program. Examples of the calculation processor include an MPU and a CPU. Examples of the storage include memory. The second controller 12 may be a single controller that performs centralized control or may be multiple controllers that cooperate with one another to perform distributed control.

Note that in the case where the temperature of the electrochemical cells is measured, for example, by the temperature detector 60, the second controller 12 can receive this temperature as a signal (for example, a voltage) transmitted from the temperature detector 60. When the second controller 12 determines that the temperature has increased, the second controller 12 transmits a control signal to the cooler 11 to control the degree of cooling by the cooler 11.

Meanwhile, the above value of increased pressure having correlation with the temperature of the electrochemical cells is information on the pressure value of hydrogen the pressure of which has been increased by the electrochemical hydrogen pump 3, and the second controller 12 can obtain this value of increased pressure, for example, as a signal (for example, a voltage) transmitted from a detector that measures the pressure value of hydrogen the pressure of which has been increased. When the second controller 12 determines that the value of increased pressure has increased, the second controller 12 transmits a control signal to the cooler 11 to control the degree of cooling by the cooler 11.

Thus, in the hydrogen system 102 according to the third embodiment, it is possible to increase the degree of cooling by the cooler 11 using the second controller 12, based on the increase in the temperature received from the electrochemical hydrogen pump 3. In other words, it is possible to decrease the temperature of the hydrogen-containing gas according to the increase in the temperature of the electrochemical cells included in the electrochemical hydrogen pump 3.

Thus, it is possible to control the temperature of the hydrogen-containing gas in such a way that the electrochemical hydrogen pump 3 can be at the optimum temperature for operating with high efficiency.

Except the above feature, the hydrogen system 102 according to the present embodiment may be the same as or similar to the hydrogen system according to any one of the first embodiment, the modification of the first embodiment, and the second embodiment.

Fourth Embodiment

Figure 7:
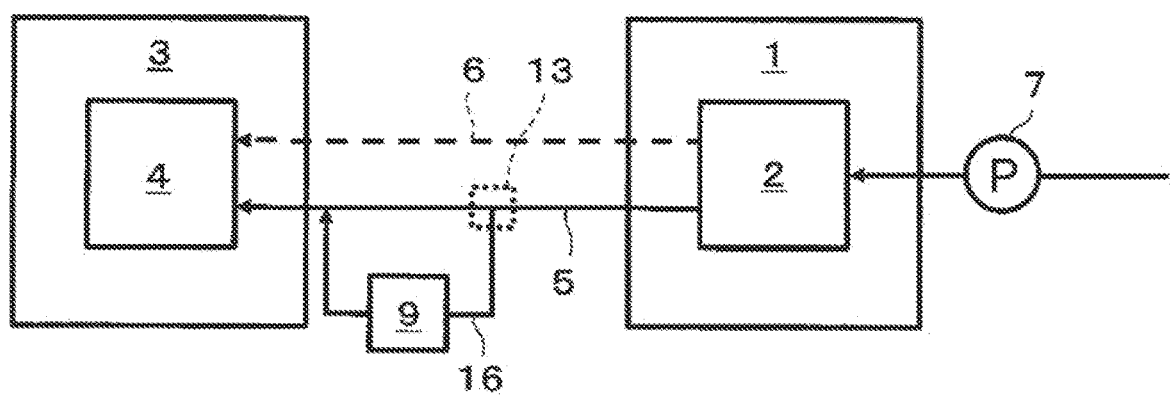
FIG. 7 is a block diagram schematically illustrating an example of a hydrogen system according to a fourth embodiment of the present disclosure.

Next, a fourth embodiment of the present disclosure will be described with reference to FIG. 7. FIG. 7 is a block diagram schematically illustrating an example of a hydrogen system 103 according to the fourth embodiment of the present disclosure. In FIG. 7, the flow of a heat medium (first heat medium) between a water electrolysis apparatus 1 and an electrochemical hydrogen pump 3 included in the hydrogen system 103 is indicated by solid line arrows, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted.

The hydrogen system 103 according to the fourth embodiment further includes a first flow-rate controller 13, a first flow path 5 through which the first heat medium flows, and a first branch path 16 that branches off from the first flow path 5, passes through the cooler 9, and merges into the first flow path 5 again, in addition to the configuration of the hydrogen system 101 according to the second embodiment.

The first flow-rate controller 13 controls the flow rate of the first heat medium flowing into the first branch path 16. The first flow-rate controller 13 may have any configuration that can control the flow rate of the first heat medium flowing into the first branch path 16. Examples of the first flow-rate controller 13 include a three-way valve, a combination of two-way valves, a needle valve, a mass flow controller, or a flow-rate control device with a pressure booster or the like.

For example, the first flow-rate controller 13 may be a flow-rate control device that is provided at the branch point where the first branch path 16 branches off from the first flow path 5 and is capable of controlling the split flow ratio of the first heat medium.

Alternatively, the first flow-rate controller 13 may be, for example, a flow-rate control device that is capable of controlling the flow rate of the first heat medium and provided at one or both of a position on the first branch path 16 and a position on the first flow path 5, downstream of the above branch point and upstream of the confluence point at which the first branch path 16 and the first flow path 5 merge.

Note that the cooler 9 is the same as or similar to the one in the hydrogen system 101 according to the second embodiment, and hence, description thereof is omitted.

The first heat medium performs heat exchange with the water electrolysis stack 2 and collects waste heat generated at the water electrolysis cells. After that, the first heat medium having collected the waste heat flows through the first flow path 5 connecting the water electrolysis apparatus 1 and the electrochemical hydrogen pump 3, and part or all of the flow of the first heat medium is diverted from the first flow path 5 into the first branch path 16 by the first flow-rate controller 13 provided on the first flow path 5 and then run into the cooler 9 provided on the first branch path 16. Here, the first heat medium that is not diverted into the first branch path 16 continuously flows through the first flow path 5 toward the electrochemical hydrogen pump 3.

The part or all of the first heat medium that has flowed into the cooler 9 is cooled by the cooler 9 and then merges into the first flow path 5 again. With this operation, for example, in the case where part of the first heat medium flows into the cooler 9, the first heat medium cooled by the cooler 9 and the first heat medium that is not cooled mix in the first flow path 5, and thereby the first heat medium the temperature of which has been adjusted to a desired temperature is supplied to the electrochemical hydrogen pump 3.

Thus, in the configuration described above, the first heat medium flowing through the first flow path 5 without being cooled by the cooler 9 and the first heat medium that branches off from the first flow path 5 and flows through the first branch path 16 to be cooled by the cooler 9 merge in the first flow path 5. This configuration makes it possible to control the temperature of the first heat medium in such a way that the electrochemical hydrogen pump 3 can be at the optimum temperature for operating with high efficiency.

As has been described above, the first heat medium the temperature of which is controlled flows through the first flow path 5 toward the electrochemical hydrogen pump 3. In this way, heat exchange can be performed between the electrochemical hydrogen pump 3 and the first heat medium controlled to be at the optimum temperature.

Figure 8:
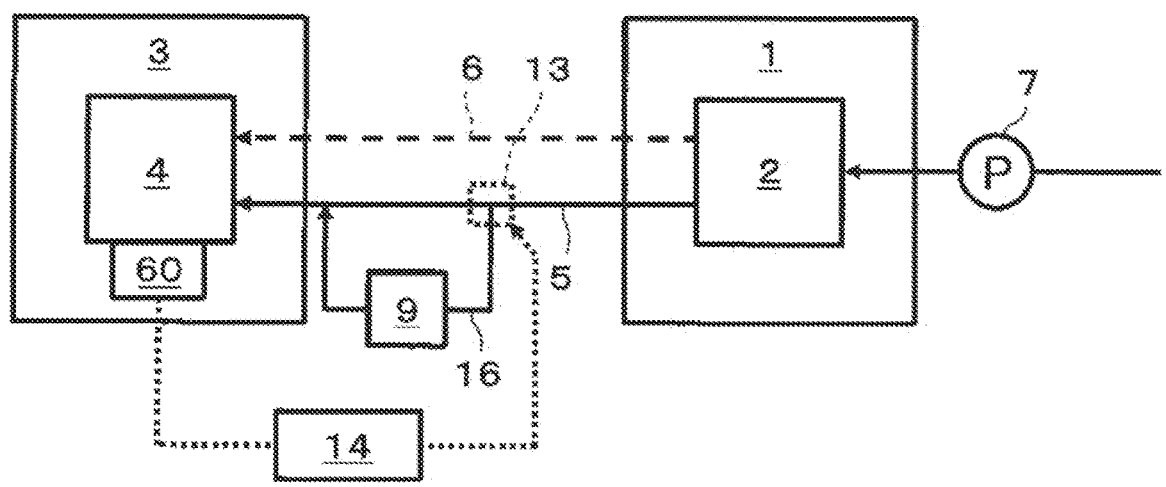
FIG. 8 is a block diagram schematically illustrating an example of a configuration related to temperature control of a first heat medium in the hydrogen system according to the fourth embodiment of the present disclosure.

Next, the temperature control of the first heat medium will be described with reference to FIG. 8. FIG. 8 is a block diagram schematically illustrating an example of a configuration related to temperature control of the first heat medium in the hydrogen system 103 according to the fourth embodiment of the present disclosure. The hydrogen system 103 further includes a third controller 14 (controller) that controls the first flow-rate controller 13 to adjust the flow rate of the first heat medium flowing into the first branch path 16, in addition to the configuration illustrated in FIG. 7 described above. Also in FIG. 8 as in FIG. 7, the flow of the heat medium (first heat medium) between the water electrolysis apparatus 1 and the electrochemical hydrogen pump 3 included in the hydrogen system 103 is indicated by a solid line arrow, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted. In addition, the flow of signals indicating the temperature of the electrochemical cells included in the electrochemical hydrogen pump 3 and control signals transmitted to the cooler 9 is indicated by an arrow with thin dashed lines. Although in this example, a temperature detector 60 is used as an example of a detector that detects temperature, the detector is not limited to this example. The detector that detects the temperature of the electrochemical cells may be one that directly detects the temperature of the electrochemical cells as the above temperature detector 60 or may be one that detects a parameter having correlation with the temperature of the electrochemical cells. The detector that detects a parameter having correlation with the temperature of the electrochemical cells may be, for example, one that detects the value of increased pressure of the electrochemical hydrogen pump 3.

When the temperature of the electrochemical cells included in the electrochemical hydrogen pump 3 increases, the third controller 14 controls the first flow-rate controller 13 in such a way that the flow rate of the first heat medium flowing through the first branch path 16 increases. The third controller 14 includes a calculation processor and a storage that stores a control program. Examples of the calculation processor include an MPU and a CPU. Examples of the storage include memory. The third controller 14 may be a single controller that performs centralized control or may be multiple controllers that cooperate with one another to perform distributed control.

Note that in the case where the temperature of the electrochemical cells is measured, for example, by the temperature detector 60, the third controller 14 can receive this temperature as a signal (for example, a voltage) transmitted from the temperature detector 60. When the third controller 14 determines that the temperature has increased, the third controller 14 transmits a control signal to the first flow-rate controller 13 to control the first flow-rate controller 13 in such a way that the flow rate of the first heat medium flowing into the first branch path 16 increases.

Meanwhile, the above value of increased pressure having correlation with the temperature of the electrochemical cells is information on the pressure value of hydrogen the pressure of which has been increased by the electrochemical hydrogen pump 3, and the third controller 14 can receive this value of increased pressure, for example, as a signal (for example, a voltage) transmitted from a detector that measures the pressure value of hydrogen the pressure of which has been increased. When the third controller 14 determines that the value of increased pressure has increased, the third controller 14 transmits a control signal to the first flow-rate controller 13 to control the first flow-rate controller 13 in such a way that the flow rate of the first heat medium flowing into the first branch path 16 increases.

Thus, in the hydrogen system 103 according to the fourth embodiment, the third controller 14 controls the flow rate of the first heat medium flowing into the first branch path 16 by using the first flow-rate controller 13 based on the temperature received from the electrochemical hydrogen pump 3. In this manner, it is possible to decrease the temperature of the first heat medium using the cooler 9 according to the increase in the amount of heat generated in the electrochemical hydrogen pump 3. Thus, it is possible to control the temperature of the first heat medium in such a way that the electrochemical hydrogen pump 3 can be at the optimum temperature for operating with high efficiency.

Meanwhile, as a possible configuration, it is conceivable that the hydrogen system does not includes the first flow-rate controller 13, and that the flow rate of the first heat medium flowing through the first branch path 16 is constant. For this configuration, when the amount of generated heat increases as the temperature of the electrochemical hydrogen pump 3 increases, it is necessary to increase the degree of cooling by the cooler 9 in order to keep the temperature of this electrochemical hydrogen pump 3 at a specified optimum temperature. For this reason, this configuration requires the degree of cooling by the cooler 9 to be adjustable, and this makes the configuration of the cooler 9 complicated.

In contrast, for the hydrogen system 103 according to the fourth embodiment, the third controller 14 is capable of controlling the first flow-rate controller 13 to increase the flow rate of the first heat medium flowing into the first branch path 16. This configuration makes it possible to control the temperature of the first heat medium, without changing the degree of cooling by the cooler 9, in such a way that the electrochemical hydrogen pump 3 can be at the optimum temperature for operating with high efficiency.

Except the above feature, the hydrogen system 103 according to the present embodiment may be the same as or similar to the hydrogen system according to any one of the first embodiment, the modification of the first embodiment, the second embodiment, and the third embodiment. Although a gas-liquid separator is not provided on the gas flow path 6 in FIGS. 7 and 8, for example, a gas-liquid separator may be further included in addition to the configuration of the hydrogen system 103 according to the fourth embodiment.

Fifth Embodiment

Figure 9:
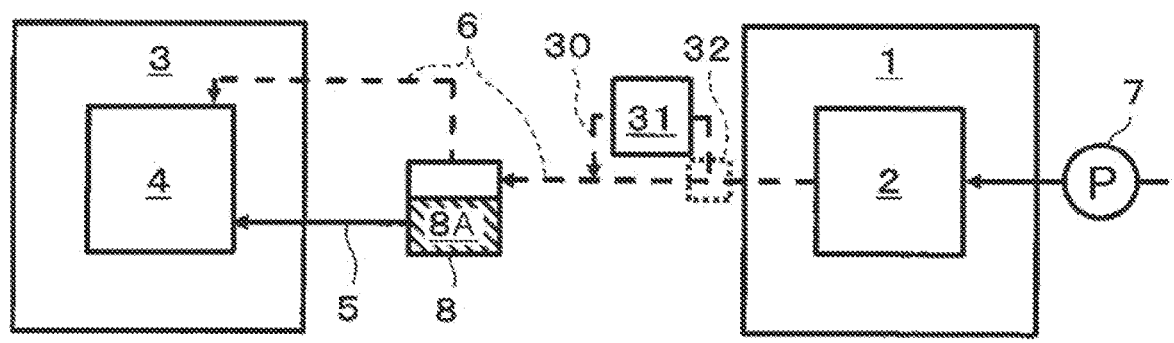
FIG. 9 is a block diagram schematically illustrating an example of a hydrogen system according to a fifth embodiment of the present disclosure.

Next, a fifth embodiment of the present disclosure will be described with reference to FIG. 9. FIG. 9 is a block diagram schematically illustrating an example of a hydrogen system 104 according to the fifth embodiment of the present disclosure. In FIG. 9, the flow of a heat medium (first heat medium) between a water electrolysis apparatus 1 and an electrochemical hydrogen pump 3 included in the hydrogen system 104 is indicated by a solid line arrow, and the flow of hydrogen-containing gas produced by electrolysis of water in the water electrolysis apparatus 1 is indicated by dashed line arrows. Note that the illustration of the flow of the water that is electrolyzed by the water electrolysis apparatus 1 is omitted.

The hydrogen system 104 according to the fifth embodiment further includes a gas flow-rate controller 32, a gas branch path 30, and a cooler 31, in addition to the configuration of the hydrogen system 101A according to the modification of the first embodiment. Specifically, the gas branch path 30 branches off from the gas flow path 6 upstream of the gas-liquid separator 8 and merges into the gas flow path 6 downstream of the branch position and upstream of the gas-liquid separator 8. The cooler 31 is an apparatus that cools the hydrogen-containing gas flowing through the gas branch path 30. Examples of the cooler 31 include a radiator (heat dissipater) and a chiller.

The gas flow-rate controller 32 is an apparatus that controls the flow rate of the hydrogen-containing gas flowing into the gas branch path 30. The gas flow-rate controller 32 may have any configuration that can control the flow rate of the hydrogen-containing gas flowing into the gas branch path 30. Examples of the gas flow-rate controller 32 include a three-way valve, a combination of two-way valves, a needle valve, a mass flow controller, or a flow-rate control device with a pressure booster or the like.

Note that detailed illustration of the gas flow-rate controller 32 is the same as or similar to that of the first flow-rate controller 13 according to the fourth embodiment, and hence, description thereof is omitted.

The first heat medium is liquid water separated from the hydrogen-containing gas in the gas-liquid separator 8 by the cooler 31 cooling the hydrogen-containing gas, and one end of the first flow path 5 is connected to a reservoir 8A in which the liquid water in the gas-liquid separator 8 collects. Specifically, the first heat medium is liquid water and water vapor in the hydrogen-containing gas that has performed heat exchange with the water electrolysis cells and has collected waste heat generated at the water electrolysis cells. After that, the first heat medium having collected waste heat flows through the first flow path 5 connecting the gas-liquid separator 8 and the electrochemical hydrogen pump 3.

Meanwhile, in the electrochemical hydrogen pump 3, as the pressure compressing hydrogen increases, overvoltage generated at electrochemical cells included in the electrochemical hydrogen pump stack 4 also increases. Accordingly, as the pressure compressing hydrogen increases, the temperature of the electrochemical hydrogen pump stack 4 increases. Here, when the temperature of the electrochemical hydrogen pump 3 overheats, it causes a problem that the cathode side of the electrochemical hydrogen pump stack 4 gets dried, hindering the movement of protons.

As above, as the pressure compressing hydrogen increases in the electrochemical hydrogen pump 3, its temperature increases, but the amount of heat of the waste heat generated in the water electrolysis apparatus 1 is constant. Hence, it is necessary to reduce the amount of heat that the hydrogen-containing gas has, as necessary, to reduce the amount of heat used to heat the electrochemical hydrogen pump 3 in heat exchange between the electrochemical hydrogen pump 3 and this hydrogen-containing gas.

In this respect, the hydrogen system 104 includes the cooler 31 and is capable of decreasing the temperature of the liquid water stored in the reservoir 8A to the optimum temperature with the cooler 31. Thus, heat exchange can be performed between the electrochemical hydrogen pump 3 and the liquid water the temperature of which has decreased to the optimum temperature, and it is possible to heat the electrochemical hydrogen pump 3 to the optimum temperature while preventing the electrochemical hydrogen pump 3 from overheating.

Figure 10:
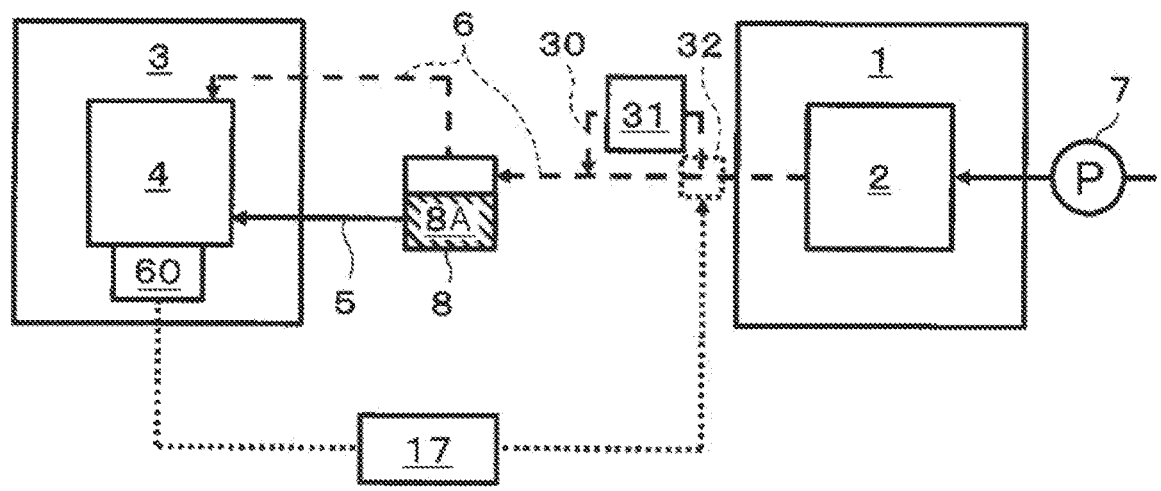
FIG. 10 is a block diagram schematically illustrating an example of a configuration related to temperature control of a first heat medium in the hydrogen system according to the fifth embodiment of the present disclosure.

Next, the temperature control of the hydrogen-containing gas will be described with reference to FIG. 10. FIG. 10 is a block diagram schematically illustrating an example of a configuration related to temperature control of the first heat medium in the hydrogen system 104 according to the fifth embodiment of the present disclosure. As illustrated in FIG. 10, the hydrogen system 104 further includes a fourth controller 17 (controller) that controls the gas flow-rate controller 32, in addition to the configuration illustrated in FIG. 9. Also in FIG. 10 as in FIG. 9, the flow of a heat medium (first heat medium) between a water electrolysis apparatus 1 and an electrochemical hydrogen pump 3 included in the hydrogen system 104 is indicated by a solid line arrow, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted. In addition, the flow of signals indicating the temperature of the electrochemical cells included in the electrochemical hydrogen pump 3 and control signals transmitted to the cooler 31 is indicated by an arrow with thin dashed lines. Although in this example, a temperature detector 60 is used as an example of a detector that detects temperature, the detector is not limited to this example. The detector that detects the temperature of the electrochemical cells may be one that directly detects the temperature of the electrochemical cells as the above temperature detector 60 or may be one that detects a parameter having correlation with the temperature of the electrochemical cells. The detector that detects a parameter having correlation with the temperature of the electrochemical cells may be, for example, one that detects the value of increased pressure of the electrochemical hydrogen pump 3.

When the temperature of the electrochemical cells included in the electrochemical hydrogen pump 3 increases, the fourth controller 17 controls the gas flow-rate controller 32 in such a way that the flow rate of the hydrogen-containing gas flowing into the gas branch path 30 increases. The fourth controller 17 includes a calculation processor and a storage that stores a control program. Examples of the calculation processor include an MPU and a CPU. Examples of the storage include memory. The fourth controller 17 may be a single controller that performs centralized control or may be multiple controllers that cooperate with one another to perform distributed control.

Note that in the case where the temperature of the electrochemical cells is measured, for example, by the temperature detector 60, the fourth controller 17 can receive this temperature as a signal (for example, a voltage) transmitted from the temperature detector 60. When the fourth controller 17 determines that the temperature has increased, the fourth controller 17 transmits a control signal to the gas flow-rate controller 32 to control the gas flow-rate controller 32 in such a way that the flow rate of the hydrogen-containing gas flowing into the gas branch path 30 increases.

Meanwhile, the above value of increased pressure having correlation with the temperature of the electrochemical cells is information on the pressure value of hydrogen the pressure of which has been increased by the electrochemical hydrogen pump 3, and the fourth controller 17 can obtain this value of increased pressure, for example, as a signal (for example, voltage) transmitted from a detector that measures the pressure value of hydrogen the pressure of which has been increased. When the fourth controller 17 determines that the value of increased pressure has increased, the fourth controller 17 transmits a control signal to the gas flow-rate controller 32 to control the gas flow-rate controller 32 in such a way that the flow rate of the hydrogen-containing gas flowing into the gas branch path 30 increases.

Thus, in the hydrogen system 104 according to the fifth embodiment, the fourth controller 17 controls the flow rate of the hydrogen-containing gas flowing into the gas branch path 30 by using the gas flow-rate controller 32 based on the increase in the temperature received from the electrochemical hydrogen pump 3. In this manner, it is possible to decrease the temperature of the hydrogen-containing gas using the cooler 31 according to the increase in the amount of heat generated in the electrochemical hydrogen pump 3. Thus, it is possible to control the temperature of the hydrogen-containing gas in such a way that the electrochemical hydrogen pump 3 can be at the optimum temperature for operating with high efficiency.

Meanwhile, as a possible configuration, it is conceivable that the hydrogen system does not includes the gas flow-rate controller 32, and that the flow rate of the hydrogen-containing gas flowing through the gas branch path 30 is constant. For this configuration, when the amount of generated heat increases as the temperature of the electrochemical hydrogen pump 3 increases, it is necessary to increase the degree of cooling by the cooler 31 in order to keep the temperature of this electrochemical hydrogen pump 3 at a specified optimum temperature. For this reason, this configuration requires the degree of cooling by the cooler 31 to be adjustable, and this makes the configuration of the cooler 31 complicated.

In contrast, for the hydrogen system 104 according to the fifth embodiment, the fourth controller 17 is capable of controlling the gas flow-rate controller 32 to increase the flow rate of the hydrogen-containing gas flowing into the gas branch path 30. This configuration makes it possible to control the temperature of the hydrogen-containing gas, without changing the degree of cooling by the cooler 31, in such a way that the electrochemical hydrogen pump 3 can be at the optimum temperature for operating with high efficiency.

Except the above feature, the hydrogen system 104 according to the present embodiment may be the same as or similar to the hydrogen system according to any one of the first embodiment, the modification of the first embodiment, the second embodiment, the third embodiment, and the fourth embodiment.

Sixth Embodiment

Figure 11:
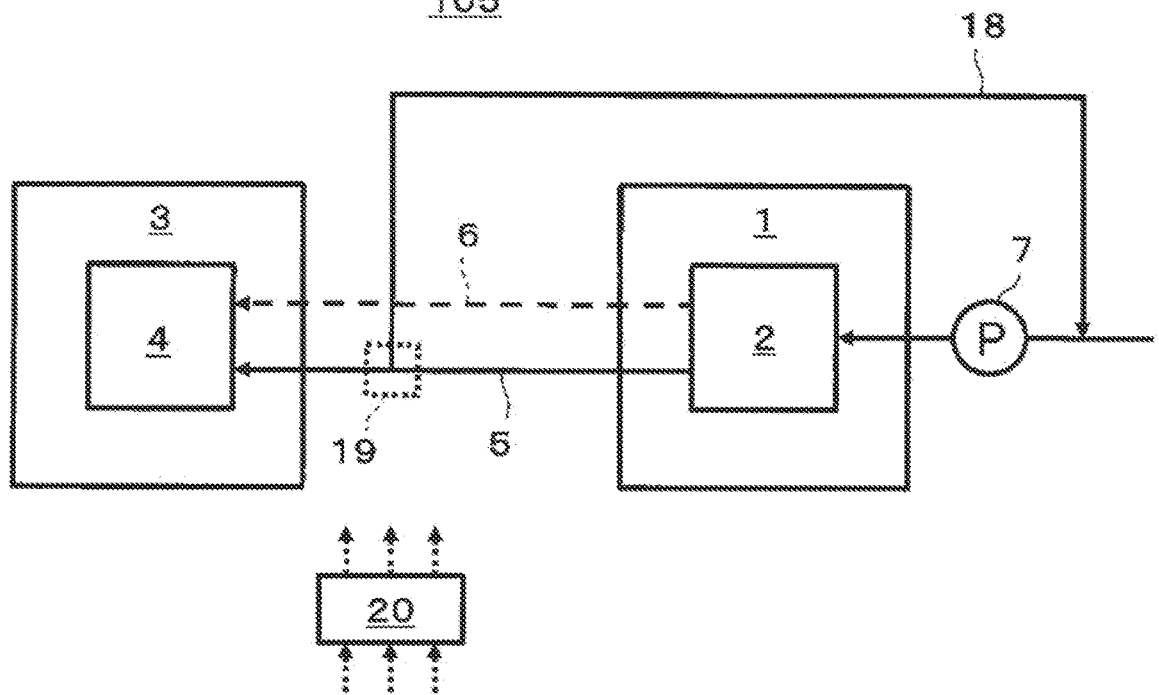
FIG. 11 is a block diagram schematically illustrating an example of a hydrogen system according to a sixth embodiment of the present disclosure.

Next, a sixth embodiment of the present disclosure will be described with reference to FIG. 11. FIG. 11 is a block diagram schematically illustrating an example of a hydrogen system 105 according to the sixth embodiment of the present disclosure. In FIG. 11, the flow of a heat medium (first heat medium) between a water electrolysis apparatus 1 and an electrochemical hydrogen pump 3 included in the hydrogen system 105 is indicated by solid line arrows, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted.

The hydrogen system 105 according to the sixth embodiment further includes a back-flow path 18, a back-flow-rate controller 19, and a fifth controller 20 (controller), in addition to the configuration of the hydrogen system 100 according to the first embodiment. The back-flow path 18 branches off from the first flow path 5 and returns to the water electrolysis apparatus 1. The back-flow-rate controller 19 is an apparatus that controls the flow rate of the first heat medium flowing into the back-flow path 18. The back-flow-rate controller 19 may have any configuration that can control the flow rate of the first heat medium flowing into the back-flow path 18. Examples of the back-flow-rate controller 19 include a three-way valve, a combination of two-way valves, a needle valve, a mass flow controller, or a flow-rate control device with a pressure booster or the like.

Note that detailed illustration of the back-flow-rate controller 19 is the same as or similar to that of the first flow-rate controller 13 according to the fourth embodiment, and hence, description thereof is omitted.

The first heat medium performs heat exchange with the water electrolysis stack 2 and collects waste heat generated at the water electrolysis cells. After that, the first heat medium having collected the waste heat flows through the first flow path 5 connecting the water electrolysis apparatus 1 and the electrochemical hydrogen pump 3, and part or all of the flow of the first heat medium is diverted from the first flow path 5 into the back-flow path 18 by the back-flow-rate controller 19 provided on the first flow path 5 and returned to the water electrolysis apparatus 1. Here, the first heat medium that is not diverted into the back-flow path 18 continuously flows through the first flow path 5 toward the electrochemical hydrogen pump 3.

The fifth controller 20 controls the back-flow-rate controller 19, For example, when the water electrolysis apparatus 1 is performing water electrolysis, and the electrochemical hydrogen pump 3 has not started operation yet, the fifth controller 20 controls the back-flow-rate controller 19 in such a way that the flow rate of the first heat medium flowing through the back-flow path 18 is higher than the flow rate of the first heat medium flowing through the first flow path 5 downstream of the branch point of the back-flow path 18. For example, when the water electrolysis apparatus 1 is performing water electrolysis, and the electrochemical hydrogen pump 3 has started operation, the fifth controller 20 controls the back-flow-rate controller 19 in such a way that the flow rate of the first heat medium flowing through the first flow path 5 downstream of the branch point of the back-flow path 18 is higher than the flow rate of the first heat medium flowing through the back-flow path 18. In addition, for example, when the temperature of the electrochemical cells included in the electrochemical hydrogen pump 3 increases, the fifth controller 20 controls the back-flow-rate controller 19 in such a way that the flow rate of the first heat medium flowing into the back-flow path 18 increases.

The fifth controller 20 includes a calculation processor and a storage that stores a control program. Examples of the calculation processor include an MPU and a CPU. Examples of the storage include memory. The fifth controller 20 may be a single controller that performs centralized control or may be multiple controllers that cooperate with one another to perform distributed control.

Since the hydrogen system 105 according to the sixth embodiment includes the fifth controller 20 as described above, it is possible to increase or decrease the flow rate of the first heat medium flowing into the back-flow path 18 as appropriate according to the use state of the electrochemical hydrogen pump 3 and the water electrolysis apparatus 1, by using the back-flow-rate controller 19. For example, when the water electrolysis apparatus 1 is performing water electrolysis, and the electrochemical hydrogen pump 3 has not started operation yet, the back-flow-rate controller 19 makes the flow rate of the first heat medium flowing into the back-flow path 18 higher than the flow rate of the first heat medium flowing through the first flow path 5 downstream of the branch point of the back-flow path 18, and this prevents useless heat supply to the electrochemical hydrogen pump 3.

In addition, for example, when the water electrolysis apparatus 1 is performing water electrolysis, and the electrochemical hydrogen pump 3 has started operation, the back-flow-rate controller 19 makes the flow rate of the first heat medium flowing through the first flow path 5 downstream of the branch point of the back-flow path 18 higher than the flow rate of the first heat medium flowing into the back-flow path 18, and this makes it easy to heat the electrochemical hydrogen pump 3 utilizing waste heat of the water electrolysis cells.

Further, since the flow rate of the first heat medium flowing into the back-flow path 18 is increased according to the increase in the amount of heat generated at the electrochemical hydrogen pump 3, it is possible to decrease the degree of heating for the electrochemical hydrogen pump 3 by the first heat medium flowing through the first flow path 5 downstream of the branch point of the back-flow path 18. Thus, it is possible to control the flow rate of the first heat medium flowing into the electrochemical hydrogen pump 3 in such a way that the electrochemical hydrogen pump 3 can be at the optimum temperature for operating with high efficiency.

Except the above feature, the hydrogen system 105 according to the present embodiment may be the same as or similar to the hydrogen system according to any one of the first embodiment, the modification of the first embodiment, the second embodiment, the third embodiment, the fourth embodiment, and the fifth embodiment. Although, for example, a gas-liquid separator is not provided on the gas flow path 6 in FIG. 11, for example, a gas-liquid separator may be further included in addition to the configuration of the hydrogen system 105 according to the sixth embodiment.

Seventh Embodiment

Figure 12:
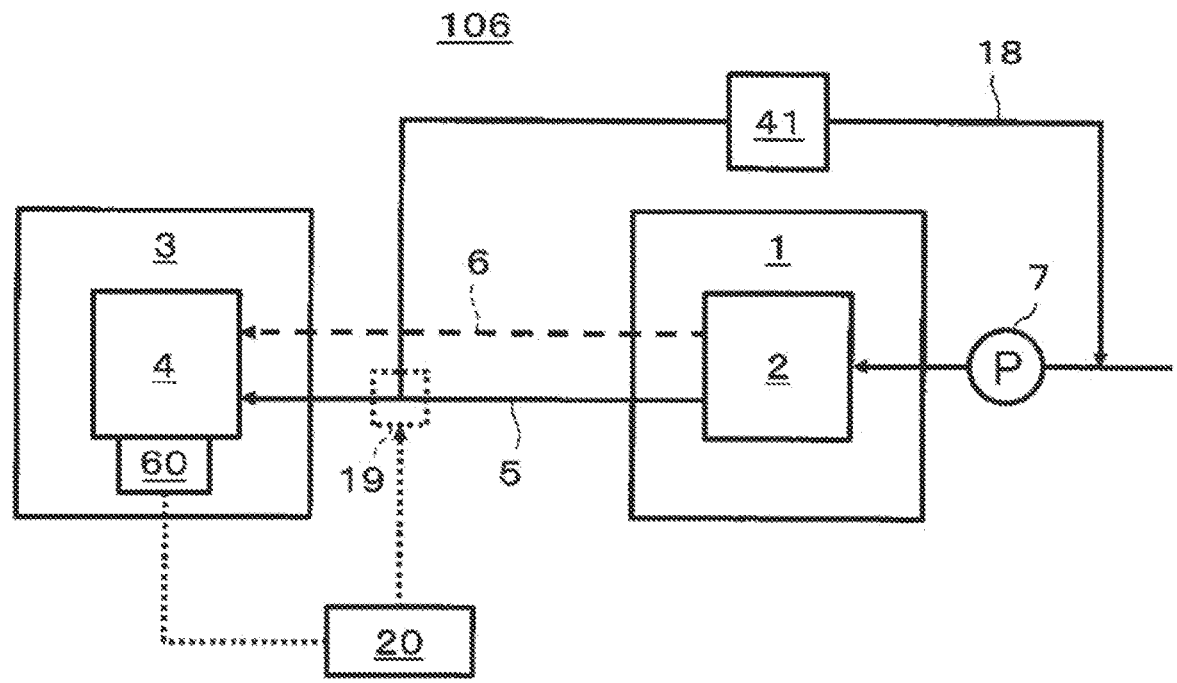
FIG. 12 is a block diagram schematically illustrating an example of a configuration related to temperature control of a first heat medium in a hydrogen system according to a seventh embodiment of the present disclosure.

Next, a seventh embodiment of the present disclosure will be described with reference to FIG. 12. FIG. 12 is a block diagram schematically illustrating an example of a configuration related to temperature control of the first heat medium in a hydrogen system 106 according to the seventh embodiment of the present disclosure. In FIG. 12, the flow of a heat medium (first heat medium) between a water electrolysis apparatus 1 and an electrochemical hydrogen pump 3 included in the hydrogen system 106 is indicated by solid line arrows, and the flow of hydrogen-containing gas produced by electrolysis of water in the water electrolysis apparatus 1 is indicated by a dashed line arrow. Note that the illustration of the flow of the water that is electrolyzed by the water electrolysis apparatus 1 is omitted. In addition, the flow of signals indicating the temperature of the electrochemical cells included in the electrochemical hydrogen pump 3 and control signals transmitted to a back-flow-rate controller 19 is indicated by an arrow with thin dashed lines. Although in this example, a temperature detector 60 is used as an example of a detector that detects temperature, the detector is not limited to this example. The detector that detects the temperature of the electrochemical cells may be one that directly detects the temperature of the electrochemical cells as the above temperature detector 60 or may be one that detects a parameter having correlation with the temperature of the electrochemical cells. The detector that detects a parameter having correlation with the temperature of the electrochemical cells may be, for example, one that detects the value of increased pressure of the electrochemical hydrogen pump 3.

The hydrogen system 106 according to the seventh embodiment further includes a cooler 41 in addition to the configuration of the hydrogen system 105 according to the sixth embodiment. Specifically, the cooler 41 is an apparatus that cools the first heat medium flowing through the back-flow path 18. Examples of the cooler 41 include a radiator (heat dissipater) and a chiller.

The first heat medium performs heat exchange with the water electrolysis stack 2 and collects waste heat generated at the water electrolysis cells. After that, the first heat medium having collected the waste heat flows through the first flow path 5 connecting the water electrolysis apparatus 1 and the electrochemical hydrogen pump 3, and part of the flow of the first heat medium is diverted from the first flow path 5 into the back-flow path 18 by the back-flow-rate controller 19 provided on the first flow path 5 and run into the cooler 41 provided on the back-flow path 18. Here, the first heat medium that is not diverted into the back-flow path 18 continuously flows through the first flow path 5 toward the electrochemical hydrogen pump 3. Note that the first heat medium diverted into the back-flow path 18 is cooled by the cooler 41 and returned to the water electrolysis apparatus 1, and then it flows through the first flow path 5 again.

Thus, since the hydrogen system 106 according to the present embodiment is capable of cooling the first heat medium with the cooler 41 appropriately when the first heat medium flows through the back-flow path 18, it is possible to keep the water electrolysis apparatus 1 at an appropriate temperature by means of the temperature control of the first heat medium flowing through the back-flow path 18. In addition, since heat exchange is performed between the electrochemical hydrogen pump 3 and the first heat medium that flows through the first flow path 5 downstream of the branch point where the back-flow path 18 branches off from the first flow path 5, it is possible to control the temperature of the electrochemical hydrogen pump 3 appropriately by adjusting the flow rate of this first heat medium.

Next, the temperature control of the first heat medium will be described with reference to FIG. 12.

When the temperature of the electrochemical cells included in the electrochemical hydrogen pump 3 increases, the fifth controller 20 controls the back-flow-rate controller 19 in such a way that the flow rate of the first heat medium flowing into the back-flow path 18 increases.

The fifth controller 20 includes a calculation processor and a storage that stores a control program. Examples of the calculation processor include an MPU and a CPU. Examples of the storage include memory. The fifth controller 20 may be a single controller that performs centralized control or may be multiple controllers that cooperate with one another to perform distributed control.

Note that in the case where the temperature of the electrochemical cells is measured, for example, by the temperature detector 60, the fifth controller 20 can receive this temperature as a signal (for example, a voltage) transmitted from the temperature detector 60. When the fifth controller 20 determines that the temperature has increased, the fifth controller 20 transmits a control signal to the back-flow-rate controller 19 to control the back-flow-rate controller 19 in such a way that the flow rate of the first heat medium flowing into the back-flow path 18 increases.

Meanwhile, the above value of increased pressure having correlation with the temperature of the electrochemical cells is information on the pressure value of hydrogen the pressure of which has been increased by the electrochemical hydrogen pump 3, and the fifth controller 20 can receive this value of increased pressure, for example, as a signal (for example, a voltage) transmitted from a detector that measures the pressure value of hydrogen the pressure of which has been increased. When the fifth controller 20 determines that the value of increased pressure has increased, the fifth controller 20 transmits a control signal to the back-flow-rate controller 19 to control the back-flow-rate controller 19 in such a way that the flow rate of the first heat medium flowing into the back-flow path 18 increases.

As described above, in the hydrogen system 106 according to the seventh embodiment, since the flow rate of the first heat medium flowing into the back-flow path 18 is increased according to the increase in the amount of heat generated at the electrochemical hydrogen pump 3, it is possible to decrease the degree of heating for the electrochemical hydrogen pump 3 by the first heat medium flowing through the first flow path 5 downstream of the branch point of the back-flow path 18. Thus, it is possible to control the flow rate of the first heat medium flowing into the electrochemical hydrogen pump 3 in such a way that the electrochemical hydrogen pump 3 can be at the optimum temperature for operating with high efficiency.

Except the above feature, the hydrogen system 106 according to the present embodiment may be the same as or similar to the hydrogen system according to any one of the first embodiment, the modification of the first embodiment, the second embodiment, the third embodiment, the fourth embodiment, the fifth embodiment, and the sixth embodiment. Although a gas-liquid separator is not provided on the gas flow path 6 in FIG. 12, for example, a gas-liquid separator may be further included in addition to the configuration of the hydrogen system 106 according to the seventh embodiment.

Modification of Seventh Embodiment

Figure 13:
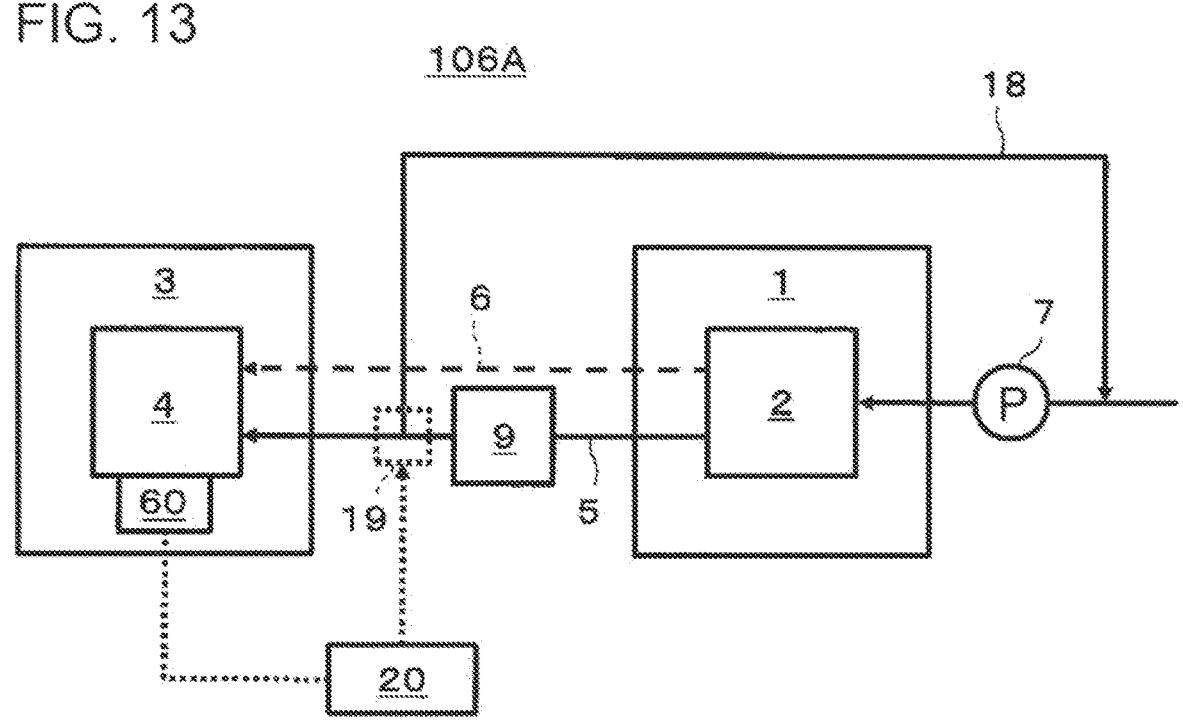
FIG. 13 is a block diagram schematically illustrating an example of a configuration related to temperature control of a first heat medium in a hydrogen system according to a modification of the seventh embodiment of the present disclosure.

Next, a modification of the seventh embodiment of the present disclosure will be described with reference to FIG. 13. FIG. 13 is a block diagram schematically illustrating an example of a configuration related to temperature control of the first heat medium in a hydrogen system 106A according to the modification of the seventh embodiment of the present disclosure.

The hydrogen system 106A according to the modification of the seventh embodiment further includes a cooler 9 in addition to the configuration of the hydrogen system 105 according to the sixth embodiment. Specifically, the back-flow path 18 branches off from the first flow path 5 downstream of the cooler 9. Note that the cooler 9 is the same as or similar to the one in the hydrogen system 101 according to the second embodiment, and hence, detailed description thereof is omitted.

The first heat medium performs heat exchange with the water electrolysis stack 2 and collects waste heat generated at the water electrolysis cells. After that, the first heat medium having collected the waste heat flows through the first flow path 5 connecting the water electrolysis apparatus 1 and the electrochemical hydrogen pump 3 and is cooled when the first heat medium passes through the cooler 9 provided on the first flow path 5.

Then, part of the flow of the first heat medium is diverted from the first flow path 5 into the back-flow path 18 by the back-flow-rate controller 19 provided on the first flow path 5. Here, the first heat medium that is not diverted into the back-flow path 18 continuously flows through the first flow path 5 toward the electrochemical hydrogen pump 3.

In the hydrogen system 106A according to the present modification, the cooler 9 can also serve the function of the cooler 41 to keep the water electrolysis apparatus 1 at an appropriate temperature described in the seventh embodiment.

In the hydrogen system 106A according to the present modification, in addition to the temperature control of the electrochemical hydrogen pump 3 by adjusting the flow rate of the first heat medium flowing through the first flow path 5 downstream of the above branch point, as described in the seventh embodiment, the degree of cooling by the cooler 9 is adjusted according to the increase in the amount of heat generated at the electrochemical hydrogen pump, and thus it is possible to control the temperature of the electrochemical hydrogen pump 3 more appropriately.

Next, the temperature control of the first heat medium will be described with reference to FIG. 13.

When the temperature of the electrochemical cells included in the electrochemical hydrogen pump 3 increases, the fifth controller 20 controls the back-flow-rate controller 19 in such a way that the flow rate of the first heat medium flowing into the back-flow path 18 increases. Alternatively, when the temperature of the electrochemical cells included in the electrochemical hydrogen pump 3 increases, the fifth controller 20 increases the degree of cooling by the cooler 9. Note that detailed descriptions of the configuration and the way of control of the fifth controller 20 are the same as or similar to those in the seventh embodiment, and hence, description thereof is omitted.

As described above, in the hydrogen system 106A according to the modification of the seventh embodiment, the fifth controller 20 controls the flow rate of the first heat medium flowing into the back-flow path 18 by using the back-flow-rate controller 19, based on the temperature received from the electrochemical hydrogen pump 3. Specifically, the flow rate of the first heat medium flowing into the back-flow path 18 is increased according to the increase in the amount of heat generated at the electrochemical hydrogen pump 3, and this decreases the degree of heating for the electrochemical hydrogen pump 3 by the first heat medium flowing through the first flow path 5 downstream of the branch point of the back-flow path 18. In addition, in the electrochemical hydrogen pump 3 in the present modification, the first heat medium can be cooled appropriately by the cooler 9 when the first heat medium flows through the first flow path 5 upstream of the branch point of the back-flow path 18. Thus, it is possible to decrease the temperature of the first heat medium by increasing the degree of cooling by the cooler 9 according to the increase in the amount of heat generated at the electrochemical hydrogen pump 3. Thus, it is possible to control the temperature of the first heat medium in such a way that the electrochemical hydrogen pump 3 can be at the optimum temperature for operating with high efficiency.

Except the above feature, the hydrogen system 106A according to the present modification may be the same as or similar to the hydrogen system according to any one of the first embodiment, the modification of the first embodiment, the second embodiment, the third embodiment, the fourth embodiment, the fifth embodiment, the sixth embodiment, and the seventh embodiment. Although a gas-liquid separator is not provided on the gas flow path 6 in FIG. 13, for example, a gas-liquid separator may be further included in addition to the configuration of the hydrogen system 106A according to the modification of the seventh embodiment.

Eighth Embodiment

Figure 14:
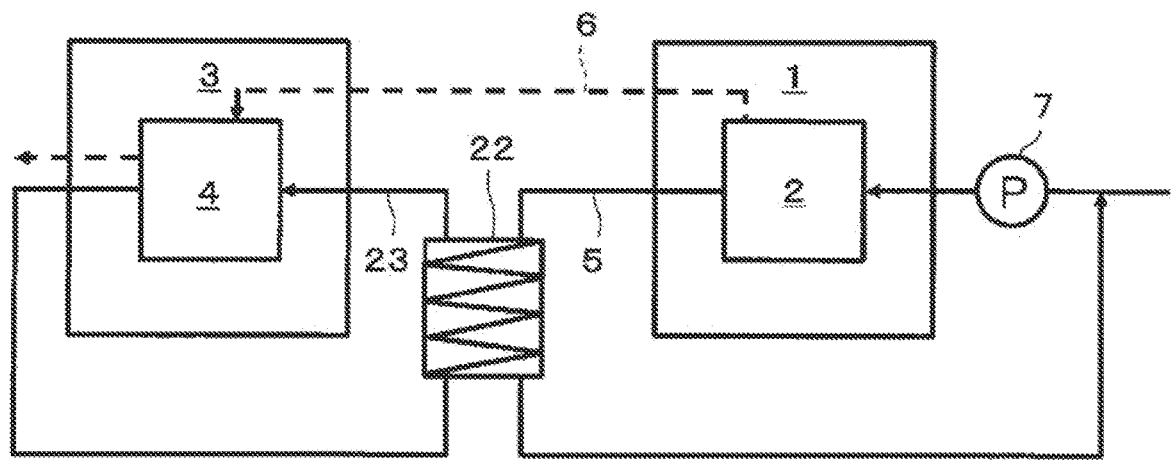
FIG. 14 is a block diagram schematically illustrating an example of a hydrogen system according to an eighth embodiment of the present disclosure.

Next, an eighth embodiment of the present disclosure will be described with reference to FIG. 14. FIG. 14 is a block diagram schematically illustrating an example of a hydrogen system 107 according to the eighth embodiment of the present disclosure. In FIG. 14, the flows of heat media (a first heat medium and a second heat medium) between a water electrolysis apparatus 1 and an electrochemical hydrogen pump 3 included in the hydrogen system 107 are indicated by solid line arrows, and the flow of hydrogen-containing gas produced by electrolysis of water in the water electrolysis apparatus 1 is indicated by dashed line arrows. Note that the illustration of the flow of the water that is electrolyzed by the water electrolysis apparatus 1 is omitted.

The hydrogen system 107 according to the eighth embodiment is different from the hydrogen system 100 according to the first embodiment in that the hydrogen system 107 has a first flow path 5 through which the first heat medium that performs heat exchange with the water electrolysis apparatus 1 circulates, that the hydrogen system 107 also has a second flow path 23 through which the second heat medium that performs heat exchange with the first heat medium and then performs heat exchange with the electrochemical hydrogen pump 3 circulates, and that the hydrogen system 107 has a heat exchanger 22 at which heat exchange is performed between the liquid first heat medium and the liquid second heat medium.

Specifically, the hydrogen system 107 according to the eighth embodiment includes the water electrolysis apparatus 1, the electrochemical hydrogen pump 3, the first flow path 5 through which the first heat medium that collects waste heat of the water electrolysis cells flows, and the second flow path 23 through which the second heat medium that performs heat exchange with the first heat medium at the heat exchanger 22 and then performs heat exchange with the electrochemical hydrogen pump 3 flows. The first flow path 5 and the second flow path 23 are arranged in such a way that heat exchange can be performed between the first heat medium and the second heat medium at the heat exchanger 22.

The heat exchanger 22 may have any configuration in which heat exchange can be performed between the first heat medium and the second heat medium.

For example, a pipe of the first flow path 5 and a pipe of the second flow path 23 may be arranged in such a way that parts of those pipes are in contact with each other, and the portions of the pipes that are in contact may be made of materials having high thermal conductivities. In this case, the contact portions of those pipes serve as the heat exchanger 22.

Alternatively, the heat exchanger 22 may be a thermal storage that stores the second heat medium. With this configuration, the second heat medium having collected waste heat of the water electrolysis cells can be stored in the thermal storage, and thus, the heat that the second heat medium in the thermal storage has can be utilized to heat the electrochemical hydrogen pump 3 as necessary at appropriate times by circulating the second heat medium. Examples of such a thermal storage include a hot-water storage tank provided with a pipe serving as the first flow path 5. In this case, heat exchange is performed in the hot-water storage tank between the first heat medium flowing through this pipe and the water inside the hot-water storage tank (the second heat medium).

Alternatively, the heat exchanger 22 may be a thermal storage that stores a third heat medium, and the first flow path 5 and the second flow path 23 may perform heat exchange with the third heat medium. With this configuration, the third heat medium having collected waste heat of the water electrolysis cells can be stored in the thermal storage, and thus, the heat that the third heat medium in the thermal storage has can be utilized to heat the electrochemical hydrogen pump 3 as necessary at appropriate times by circulating the second heat medium. Examples of such a thermal storage include a hot-water storage tank provided with a pipe serving as the first flow path 5 and a pipe serving as the second flow path 23, In this case, heat exchange is performed in the hot-water storage tank between the first heat medium flowing through the former pipe and the water inside the hot-water storage tank (the third heat medium). Then, heat exchange is performed in the hot-water storage tank between the second heat medium flowing through the latter pipe and the water inside the hot-water storage tank (the third heat medium).

After the first heat medium performs heat exchange with the water electrolysis apparatus 1, the first heat medium flows through the first flow path 5 and performs heat exchange at the heat exchanger 22 with the second heat medium. This heat exchange with the second heat medium takes heat away from the first heat medium, and then the first heat medium returns to the water electrolysis apparatus 1 again. The second heat medium takes heat that the first heat medium had in the heat exchange with the first heat medium and flows through the second flow path 23 so that the second heat medium can perform heat exchange with the electrochemical hydrogen pump 3. In this way, the second heat medium having performed heat exchange with the first heat medium flows to the electrochemical hydrogen pump 3 through the second flow path 23 and performs heat exchange with the electrochemical hydrogen pump 3. In this heat exchange, the second heat medium heats the electrochemical hydrogen pump 3 to a specified temperature, and heat that the second heat medium had is taken away. In this state, the second heat medium flows through the second flow path 23, and after that, the second heat medium circulates to perform heat exchange with the first heat medium.

Thus, the hydrogen system 107 according to the eighth embodiment can give part of the waste heat collected from the water electrolysis apparatus 1 by the first heat medium to the electrochemical hydrogen pump 3 via the second heat medium flowing through the second flow path 23.

Figure 15:
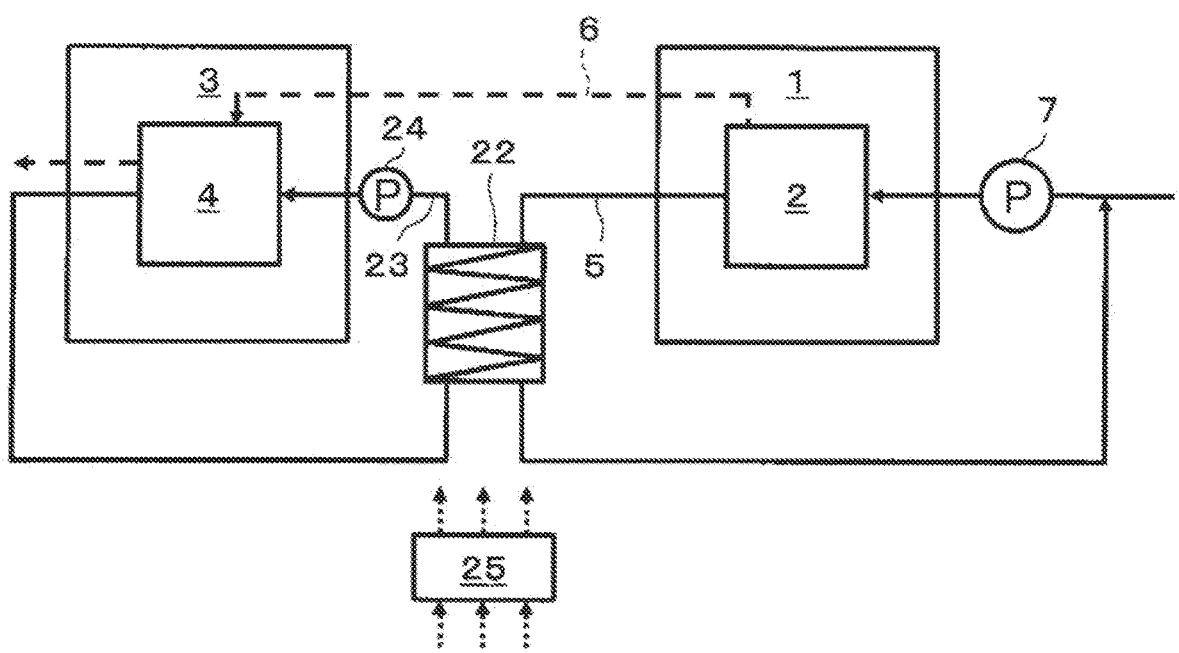
FIG. 15 is a block diagram schematically illustrating an example of a hydrogen system according to the eighth embodiment of the present disclosure.

Further, as illustrated in FIG. 15, a hydrogen system 108 according to the eighth embodiment may further include a second deliverer 24 and a sixth controller 25 (controller) in addition to the configuration illustrated in FIG. 14. FIG. 15 is a block diagram schematically illustrating an example of the hydrogen system 108 according to the eighth embodiment of the present disclosure. Note that also in FIG. 15 as in FIG. 14, the flows of heat media (a first heat medium and a second heat medium) between a water electrolysis apparatus 1 and an electrochemical hydrogen pump 3 included in the hydrogen system 108 are indicated by solid line arrows, and the flow of the hydrogen-containing gas produced by electrolysis of water in the water electrolysis apparatus 1 is indicated by dashed line arrows. Note that the illustration of the flow of the water that is electrolyzed by the water electrolysis apparatus 1 is omitted.

The second deliverer 24 is a device that is provided on the second flow path 23 and delivers the second heat medium. The second deliverer 24 may be, for example, a device that controls the flow rate of fluid such as a mass flow controller or a pressure booster or may be, in the case where the second heat medium is originally pressurized, a flow-rate adjustment valve. An example of the second heat medium flowing through the second flow path 23 is water.

The sixth controller 25 performs control in such a way that the operation of the second deliverer 24 starts when the electrochemical hydrogen pump 3 starts operation. The sixth controller 25 includes a calculation processor and a storage that stores a control program. Examples of the calculation processor include an MPU and a CPU. Examples of the storage include memory. The sixth controller 25 may be a single controller that performs centralized control or may be multiple controllers that cooperate with one another to perform distributed control.

In the hydrogen system 108 according to the eighth embodiment, the first heat medium delivered by the first deliverer 7 collects waste heat from the water electrolysis cells and flows through the first flow path 5. Meanwhile, the sixth controller 25 starts the operation of the second deliverer 24 when the electrochemical hydrogen pump 3 starts operation. With the above operation, the second heat medium delivered by the second deliverer 24 flows through the second flow path 23 and promotes heat exchange with the first heat medium. Then, the second heat medium after performing heat exchange with the first heat medium flows through the second flow path 23 and then performs heat exchange with the electrochemical hydrogen pump stack 4. Thus, the electrochemical hydrogen pump 3 can be heated with the second heat medium so that the electrochemical hydrogen pump 3 can be at the optimum temperature when the electrochemical hydrogen pump 3 starts operation.

Thus, in the hydrogen system 108 according to the eighth embodiment, the temperature of the electrochemical hydrogen pump stack 4 can be increased in a very short time to a temperature at which the electrochemical hydrogen pump 3 operates with high efficiency when the electrochemical hydrogen pump 3 starts operation. In addition, waste heat of the water electrolysis cells in the water electrolysis apparatus 1 can be utilized as a heat source for heating the electrochemical hydrogen pump stack 4. Hence, the hydrogen system 108 according to the eighth embodiment has an energy efficiency higher than conventional ones and is capable of operating with high efficiency when the electrochemical hydrogen pump 3 starts operation.

Except the above feature, the hydrogen system 107 and hydrogen system 108 according to the present embodiment may be the same as or similar to the hydrogen system according to any one of the first embodiment, the modification of the first embodiment, the second embodiment, the third embodiment, the fourth embodiment, the fifth embodiment, the sixth embodiment, the seventh embodiment, and the modification of the seventh embodiment. Although a gas-liquid separator is not provided on the gas flow path 6 in FIGS. 14 and 15, for example, a gas-liquid separator may be further included in addition to the configuration of the hydrogen system 107 or hydrogen system 108 according to the eighth embodiment.

Ninth Embodiment

Figure 16:
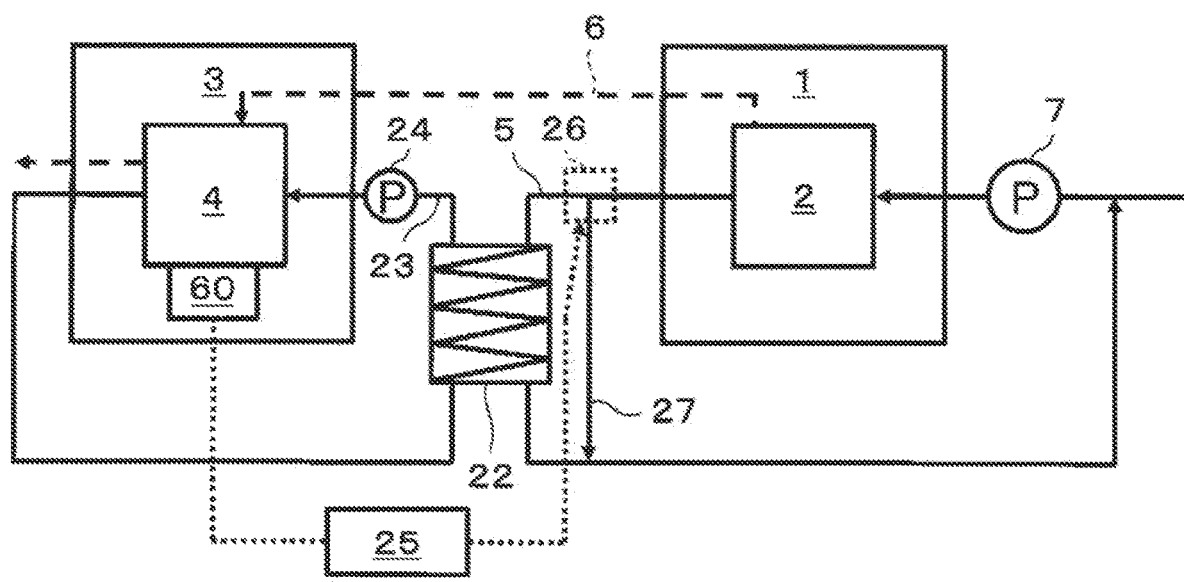
FIG. 16 is a block diagram schematically illustrating an example of a configuration related to temperature control of a heat medium in a hydrogen system according to a ninth embodiment of the present disclosure.

Next, a ninth embodiment of the present disclosure will be described with reference to FIG. 16. FIG. 16 is a block diagram schematically illustrating an example of a configuration related to temperature control of a heat medium in a hydrogen system 109 according to the ninth embodiment of the present disclosure. In FIG. 16, the flows of heat media (a first heat medium and a second heat medium) between a water electrolysis apparatus 1 and an electrochemical hydrogen pump 3 included in the hydrogen system 109 are indicated by solid line arrows, and the flow of the hydrogen-containing gas produced by electrolysis of water in the water electrolysis apparatus 1 is indicated by dashed line arrows. Note that the illustration of the flow of the water that is electrolyzed by the water electrolysis apparatus 1 is omitted. In addition, the flow of signals indicating the temperature of the electrochemical cells included in the electrochemical hydrogen pump 3 and control signals transmitted to a second flow-rate controller 26 is indicated by an arrow with thin dashed lines. Although in this example, a temperature detector 60 is used as an example of a detector that detects temperature, the detector is not limited to this example. The detector that detects the temperature of the electrochemical cells may be one that directly detects the temperature of the electrochemical cells as the above temperature detector 60 or may be one that detects a parameter having correlation with the temperature of the electrochemical cells. The detector that detects a parameter having correlation with the temperature of the electrochemical cells may be, for example, one that detects the value of increased pressure of the electrochemical hydrogen pump 3.

The hydrogen system 109 according to the ninth embodiment further includes a bypass flow path 27 and the second flow-rate controller 26, in addition to the configuration of the hydrogen system 107 according to the eighth embodiment illustrated in FIG. 14.

The bypass flow path 27 is for bypassing the heat exchanger 22. The first heat medium flows through the bypass flow path 27. As illustrated in FIG. 16, the bypass flow path 27 has one end connected to the second flow-rate controller 26 and the other end connected to a portion of the first flow path 5 where the first heat medium after performing heat exchange with the second heat medium at the heat exchanger 22 flows.

The second flow-rate controller 26 is a device that controls the flow rate of the first heat medium flowing through the bypass flow path 27. The second flow-rate controller 26 may have any configuration that controls the flow rate of the first heat medium flowing through the bypass flow path 27. Examples of the second flow-rate controller 26 include a three-way valve, a combination of two-way valves, a needle valve, a mass flow controller, or a flow-rate control device with a pressure booster or the like.

Note that detailed illustration of the second flow-rate controller 26 is the same as or similar to that of the first flow-rate controller 13 according to the fourth embodiment, and hence, description thereof is omitted.

When the temperature of the electrochemical cells included in the electrochemical hydrogen pump 3 increases, the sixth controller 25 controls the second flow-rate controller 26 to increase the flow rate of the first heat medium flowing through the bypass flow path 27.

The first heat medium performs heat exchange with the water electrolysis stack 2 and collects waste heat generated at the water electrolysis cells. After that, the first heat medium having collected the waste heat is controlled by the second flow-rate controller 26 provided on the first flow path 5 in such a way that part or all of the flow of the first heat medium flows through the heat exchanger 22 provided on the first flow path 5.

The remaining first heat medium other than the first heat medium flowing through the heat exchanger 22 is controlled by the second flow-rate controller 26 to flow through the bypass flow path 27 and merges with the first heat medium flowing through the first flow path 5. Thus, the first heat medium having performed heat exchange with the second heat medium at the heat exchanger 22 and the first heat medium that did not perform heat exchange are mixed together.

At the heat exchanger 22, heat exchange is performed between the first heat medium flowing through the first flow path 5 and the second heat medium that performs heat exchange with the electrochemical hydrogen pump 3 and flows through the second flow path 23. Thus, after the second heat medium performs heat exchange with the first heat medium at the heat exchanger 22 and takes part of the heat that the first heat medium has, the second heat medium performs heat exchange with the electrochemical hydrogen pump 3. With this operation, the electrochemical hydrogen pump 3 can be heated by utilizing the heat that the second heat medium has taken from the first heat medium.

Since the sixth controller 25 receives the temperature of the electrochemical cells included in the electrochemical hydrogen pump 3, when the sixth controller 25 determines that the temperature has increased, the sixth controller 25 controls the second flow-rate controller 26 to increase the flow rate of the first heat medium flowing through the bypass flow path 27. This operation decreases the flow rate of the first heat medium flowing through the first flow path 5 toward the heat exchanger 22, and accordingly it decreases the amount of heat that the second heat medium takes from heat exchange with the first heat medium.

Thus, in the hydrogen system 109 according to the ninth embodiment, the second flow-rate controller 26 can increase the flow rate of the first heat medium flowing through the bypass flow path 27, according to the increase in the temperature of the electrochemical cells included in the electrochemical hydrogen pump 3. In other words, it is possible to decrease the amount of heat that the second heat medium obtains from the first heat medium via the heat exchanger 22, according to the increase in the temperature of the electrochemical hydrogen pump 3.

Thus, it is possible to heat the electrochemical hydrogen pump 3 to a temperature that enables the electrochemical hydrogen pump 3 to operate with high efficiency.

Except the above feature, the hydrogen system 109 according to the present embodiment may be the same as or similar to the hydrogen system according to any one of the first embodiment, the modification of the first embodiment, the second embodiment, the third embodiment, the fourth embodiment, the fifth embodiment, the sixth embodiment, the seventh embodiment, the modification of the seventh embodiment, and the eighth embodiment. Although a gas-liquid separator is not provided on the gas flow path 6 in FIG. 16, for example, a gas-liquid separator may be further included in addition to the configuration of the hydrogen system 109 according to the ninth embodiment.

Tenth Embodiment

Figure 17:
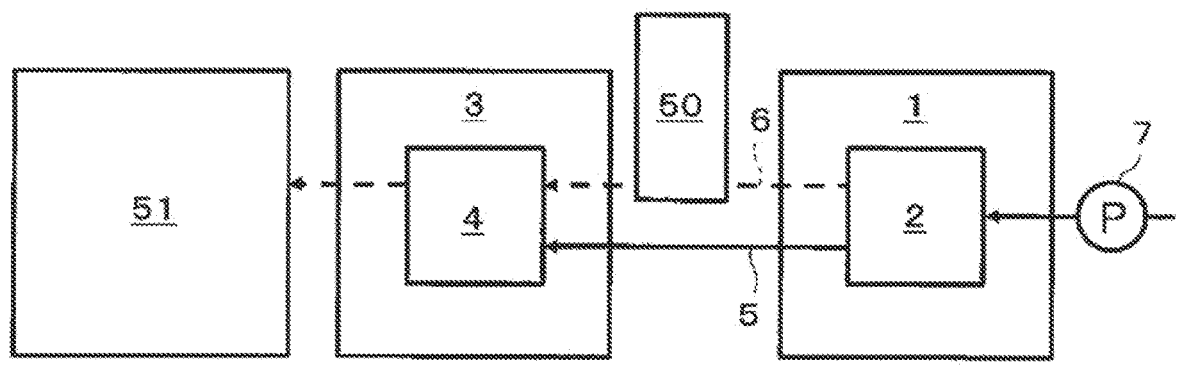
FIG. 17 is a block diagram schematically illustrating an example of a hydrogen system according to a tenth embodiment of the present disclosure.

Next, a tenth embodiment of the present disclosure will be described with reference to FIG. 17. FIG. 17 is a block diagram schematically illustrating an example of a hydrogen system 110 according to the tenth embodiment of the present disclosure. In FIG. 17, the flow of a heat medium (first heat medium) between a water electrolysis apparatus 1 and an electrochemical hydrogen pump 3 included in the hydrogen system 110 is indicated by a solid line arrow, and the flow of hydrogen-containing gas produced by electrolysis of water in the water electrolysis apparatus 1 is indicated by dashed line arrows. Note that the illustration of the flow of the water that is electrolyzed by the water electrolysis apparatus 1 is omitted.

The hydrogen system 110 according to the tenth embodiment further includes a tank 50 and a fuel cell 51 in addition to the configuration of the hydrogen system 100 according to the first embodiment.

The tank 50 is an apparatus that is provided on the gas flow path 6 and stores hydrogen-containing gas produced in the water electrolysis apparatus 1. The fuel cell 51 is provided on a gas flow path downstream of the electrochemical hydrogen pump 3.

The configuration above makes it possible to store hydrogen-containing gas produced in the water electrolysis apparatus 1 in the tank 50 and supply the hydrogen-containing gas to the electrochemical hydrogen pump 3 as necessary at appropriate times. Thus, it is possible to generate power by the fuel cell 51 as necessary at appropriate times using the hydrogen-containing gas from the electrochemical hydrogen pump 3.

For example, it is possible to provide a system independent of existing system electric power in which during the daytime or the like, surplus electric power not used as the electric power for the house, out of the electric power obtained by a solar power generation system, is used to produce the hydrogen-containing gas in the water electrolysis apparatus 1 and store it in the tank 50, and at night, this hydrogen-containing gas is used to generate power in the fuel cell 51.

Except the above feature, the hydrogen system 109 according to the present embodiment may be the same as or similar to the hydrogen system according to any one of the first embodiment, the modification of the first embodiment, the second embodiment, the third embodiment, the fourth embodiment, the fifth embodiment, the sixth embodiment, the seventh embodiment, the modification of the seventh embodiment, the eighth embodiment, and the ninth embodiment.

Note that the first embodiment, the modification of the first embodiment, the second embodiment, the third embodiment, the fourth embodiment, the fifth embodiment, the sixth embodiment, the seventh embodiment, the modification of the seventh embodiment, the eighth embodiment, the ninth embodiment, and the tenth embodiment may be combined with one another unless they conflict with one another.

In addition, the present disclosure is not limited to the above embodiments, but various changes can be made within the range of the technical spirit thereof. For example, in FIGS. 14, 15, and 16, the flow direction of the first heat medium or the second heat medium in the first flow path 5 or the second flow path 23 indicated in the figures may be reversed. In other words, from the above description, it is obvious for those skilled in the art that many improvements and other embodiments are possible on the present disclosure. Thus, the above description should be understood only as examples, and it is provided for the purpose of teaching those skilled in the art the best modes to implement the present disclosure. Thus, it is possible to change details of the structures and/or the functions substantially without departing from the spirit of the present disclosure.

The hydrogen system according to the present disclosure can be used for systems including a water electrolysis apparatus that electrolyzes water, an electrochemical hydrogen pump that compresses the generated hydrogen, and a fuel cell system that converts hydrogen into electricity.

What is claimed is:

1. A hydrogen system comprising:
a water electrolysis apparatus including a water electrolysis cell;
an electrochemical hydrogen pump that increases a pressure of hydrogen-containing gas produced by the water electrolysis apparatus;
a gas flow path that supplies the hydrogen-containing gas produced by the water electrolysis apparatus to the electrochemical hydrogen pump; and
a first flow path through which a first heat medium that is a liquid and has collected waste heat of the water electrolysis cell flows, wherein:
the electrochemical hydrogen pump is configured to be heated by heat exchange with the first heat medium after collecting the waste heat of the water electrolysis cell,
one end of the first flow path is connected to the water electrolysis apparatus, and
another end of the first flow path is connected to the electrochemical hydrogen pump so that the first heat medium flows into the electrochemical hydrogen pump.

2. The hydrogen system according to claim 1, wherein the first flow path is arranged in such a way that the first heat medium performs heat exchange with each of the water electrolysis cell and the electrochemical hydrogen pump, and after the first heat medium collects waste heat of the water electrolysis cell, the first heat medium performs heat exchange with the electrochemical hydrogen pump.

3. The hydrogen system according to claim 2, further comprising a first cooler that cools the first heat medium having collected waste heat of the water electrolysis cell before the first heat medium performs heat exchange with the electrochemical hydrogen pump.

4. The hydrogen system according to claim 3, further comprising a controller that causes the first cooler to increase a degree of cooling when a temperature of an electrochemical cell included in the electrochemical hydrogen pump increases.

5. The hydrogen system according to claim 3, wherein the first cooler is a first thermal storage that stores heat collected from the first heat medium.

6. The hydrogen system according to claim 1, wherein the first heat medium is liquid water for water electrolysis supplied to the water electrolysis apparatus.

7. The hydrogen system according to claim 1, wherein the first heat medium is coolant that cools the water electrolysis cell, and the coolant is different from liquid water for water electrolysis supplied to the water electrolysis apparatus.

8. The hydrogen system according to claim 1, further comprising:
a first cooler that cools the first heat medium having collected waste heat of the water electrolysis cell before the first heat medium performs heat exchange with the electrochemical hydrogen pump;
a first branch path that branches off from the first flow path, passes through the first cooler, and merges into the first flow path; and
a first flow-rate controller that controls a flow rate of the first heat medium flowing into the first branch path.

9. The hydrogen system according to claim 8, further comprising a controller that, when a temperature of an electrochemical cell included in the electrochemical hydrogen pump increases, causes the first flow-rate controller to increase the flow rate of the first heat medium flowing into the first branch path.

10. The hydrogen system according to claim 1, further comprising a first deliverer that delivers the first heat medium to the first flow path, wherein the first deliverer is caused to start operation when the electrochemical hydrogen pump starts operation.

11. The hydrogen system according to claim 1, further comprising a tank that is provided on the gas flow path and stores the hydrogen-containing gas.

12. The hydrogen system according to claim 1, further comprising a fuel cell provided on the gas flow path downstream of the electrochemical hydrogen pump.

13. A hydrogen system comprising:
a water electrolysis apparatus including a water electrolysis cell;
an electrochemical hydrogen pump that increases a pressure of hydrogen-containing gas produced by the water electrolysis apparatus;
a gas flow path that supplies the hydrogen-containing gas produced by the water electrolysis apparatus to the electrochemical hydrogen pump;
a first flow path through which a first heat medium that is a liquid and has collected waste heat of the water electrolysis cell flows; and
a gas-liquid separator provided on the gas flow path, wherein:
the first heat medium is liquid water separated from the hydrogen-containing gas by the gas-liquid separator,
one end of the first flow path is connected to a reservoir in which liquid water in the gas-liquid separator collects, and
another end of the first flow path is connected to the electrochemical hydrogen pump so that the first heat medium flows into the electrochemical hydrogen pump.

14. The hydrogen system according to claim 13, further comprising a second cooler that cools the hydrogen-containing gas flowing through the gas flow path upstream of the gas-liquid separator or the hydrogen-containing gas flowing inside the gas-liquid separator.

15. The hydrogen system according to claim 14, further comprising a controller that increases a degree of cooling by the second cooler when a temperature of an electrochemical cell included in the electrochemical hydrogen pump increases.

16. The hydrogen system according to claim 13, further comprising:
a gas branch path that branches off from the gas flow path upstream of the gas-liquid separator and merges into the gas flow path downstream of a position where the gas branch path branches off and upstream of the gas-liquid separator;
a second cooler that cools the hydrogen-containing gas flowing through the gas branch path; and
a gas flow-rate controller that controls a flow rate of the hydrogen-containing gas flowing into the gas branch path.

17. The hydrogen system according to claim 16, further comprising a controller that, when a temperature of an electrochemical cell included in the electrochemical hydrogen pump increases, causes the gas flow-rate controller to increase the flow rate of the hydrogen-containing gas flowing into the gas branch path.

18. A hydrogen system comprising:
a water electrolysis apparatus including a water electrolysis cell;
an electrochemical hydrogen pump that increases a pressure of hydrogen-containing gas produced by the water electrolysis apparatus;
a gas flow path that supplies the hydrogen-containing gas produced by the water electrolysis apparatus to the electrochemical hydrogen pump;
a first flow path through which a first heat medium that is a liquid and has collected waste heat of the water electrolysis cell flows;
a back-flow path that branches off from the first flow path and returns to the water electrolysis apparatus;
a back-flow-rate controller that controls a flow rate of the first heat medium flowing into the back-flow path; and
a controller that controls the back-flow-rate controller, wherein:
the electrochemical hydrogen pump is configured to be heated by heat exchange with the first heat medium after collecting the waste heat of the water electrolysis cell, and
the first flow path is arranged in such a way that the first heat medium performs heat exchange with each of the water electrolysis cell and the electrochemical hydrogen pump, and after the first heat medium collects waste heat of the water electrolysis cell, the first heat medium performs heat exchange with the electrochemical hydrogen pump.

19. The hydrogen system according to claim 18, wherein when the water electrolysis apparatus performs water electrolysis, and the electrochemical hydrogen pump does not start operation, the controller causes the back-flow-rate controller to control the flow rate of the first heat medium flowing through the back-flow path to be higher than the flow rate of the first heat medium flowing through the first flow path downstream of a branch point at which the back-flow path branches off.

20. The hydrogen system according to claim 18, wherein when the water electrolysis apparatus performs water electrolysis, and the electrochemical hydrogen pump starts operation, the controller causes the back-flow-rate controller to control the flow rate of the first heat medium flowing through the first flow path downstream of a branch point at which the back-flow path branches off to be higher than the flow rate of the first heat medium flowing through the back-flow path.

21. The hydrogen system according to claim 18, wherein when a temperature of an electrochemical cell included in the electrochemical hydrogen pump increases, the controller causes the back-flow-rate controller to increase the flow rate of the first heat medium flowing through the back-flow path.

22. The hydrogen system according to claim 18, further comprising a third cooler that cools the first heat medium flowing through the back-flow path.

23. The hydrogen system according to claim 18, further comprising a first cooler that cools the first heat medium having collected waste heat of the water electrolysis cell before the first heat medium performs heat exchange with the electrochemical hydrogen pump,
wherein the back-flow path branches off from the first flow path downstream of the first cooler.

24. A hydrogen system comprising:
a water electrolysis apparatus including a water electrolysis cell;
an electrochemical hydrogen pump that increases a pressure of hydrogen-containing gas produced by the water electrolysis apparatus;
a gas flow path that supplies the hydrogen-containing gas produced by the water electrolysis apparatus to the electrochemical hydrogen pump;
a first flow path through which a first heat medium that is a liquid and has collected waste heat of the water electrolysis cell flows; and
a heat exchanger at which heat exchange is performed between the first heat medium and a second heat medium that is a liquid; and
a second flow path through which the second heat medium flows, wherein;
the first heat medium is coolant that cools the water electrolysis cell, and the coolant is different from liquid water for water electrolysis supplied to the water electrolysis apparatus, and
the second heat medium performs heat exchange with the electrochemical hydrogen pump after performing heat exchange at the heat exchanger.

25. The hydrogen system according to claim 24, wherein the heat exchanger is a second thermal storage that stores the second heat medium.

26. The hydrogen system according to claim 24, wherein the heat exchanger is a third thermal storage that stores a third heat medium, and the first flow path and the second flow path are configured to perform heat exchange with the third heat medium.

27. The hydrogen system according to claim 24, further comprising:
a second deliverer that is provided on the second flow path and delivers the second heat medium; and
a controller that causes the second deliverer to start operation when the electrochemical hydrogen pump starts operation.

28. The hydrogen system according to claim 24, further comprising:
a bypass flow path that bypasses the heat exchanger and through which the first heat medium flows;
a second flow-rate controller that controls a flow rate of the first heat medium flowing through the bypass flow path; and
a controller that, when a temperature of an electrochemical cell included in the electrochemical hydrogen pump increases, causes the second flow-rate controller to increase the flow rate of the first heat medium flowing through the bypass flow path.

* * * * *